United States Patent
Bonham et al.

(10) Patent No.: US 7,069,667 B2
(45) Date of Patent: Jul. 4, 2006

(54) SYSTEM AND MEANS FOR DYNAMIC MICRO-POSITIONING AND ALIGNMENT OF MEDIA

(75) Inventors: Harry Bonham, Oak Point, TX (US); Tyler Dawson, Dallas, TX (US); Jay Prestipino, Plano, TX (US); Grady Roberts, McKinney, TX (US); Rahul Saini, Dallas, TX (US)

(73) Assignee: Nanolign, Inc., Plano, TX (US)

( * ) Notice: Subject to any disclaimer, the term of this patent is extended or adjusted under 35 U.S.C. 154(b) by 0 days.

(21) Appl. No.: 11/042,401

(22) Filed: Jan. 25, 2005

(65) Prior Publication Data

US 2005/0147357 A1 Jul. 7, 2005

Related U.S. Application Data

(63) Continuation of application No. 10/683,626, filed on Oct. 10, 2003, now Pat. No. 6,935,042.

(60) Provisional application No. 60/424,741, filed on Nov. 8, 2002.

(51) Int. Cl.
*G02B 6/36* (2006.01)
(52) U.S. Cl. .......................... 33/645; 385/52
(58) Field of Classification Search ................ 33/645, 33/1 M, 613, 568; 385/52, 134, 20; 414/935
See application file for complete search history.

(56) References Cited

U.S. PATENT DOCUMENTS

| | | | | |
|---|---|---|---|---|
| 5,920,665 A | * | 7/1999 | Presby | 385/16 |
| 6,471,419 B1 | * | 10/2002 | Hall et al. | 385/52 |
| 6,516,130 B1 | * | 2/2003 | Jang | 385/52 |
| 6,571,041 B1 | * | 5/2003 | Bourcier et al. | 385/52 |
| 6,647,632 B1 | * | 11/2003 | Tominaga et al. | 33/645 |
| 6,935,042 B1 | * | 8/2005 | Bonham et al. | 33/645 |

* cited by examiner

*Primary Examiner*—Christopher W. Fulton
(74) *Attorney, Agent, or Firm*—Michael Cameron, Esq.

(57) ABSTRACT

A self-contained means to move a media or component, such as fiber (12) or other miniature object, such as a lens, into a desired position is given. The fiber (12) or component is moved in various dimensions to achieve the desired location and is locked into position after the move. An input electrical signal, such as a voltage or current controls movement. A thermal actuator comprises the micro-positioner (80) using semiconductor technology in one embodiment. In another embodiment, of the present invention, a thermal or electrostatic actuator uses mechanical gears to move the fiber. Another embodiment of the present invention is implemented using mechanical technology such as microelectromechanical system (MEMS) technology. Another embodiment of the present invention, utilizes piezoelectric materials to facilitate fiber movement.

75 Claims, 28 Drawing Sheets

Move Right

Move Left

Performance Calculations

Max Fiber Force
Figure 19

FUSED SILICA
b max = 300 um Fiber Displacement
$E = 102 \times 10^5$ PSI = $7.17 g/um^2$
a = 5000 um Fiber Length
r = 62.5 um Fiber Radius W = 2.06 mg/um = 20.2 uNt/um For displacement of 100 um,
W = 2.02 mNt 1 → $W = \dfrac{3\, IEb}{a^3}$ 2 → $I = \dfrac{\pi}{4} r^4$ 3 → $W = \dfrac{3\pi}{4} E \dfrac{r^4}{a^3} b$ Range of Control

Optical Control

Collimator Performance

Constraints

No Influence

Controls Adjustment Range

SYSTEM AND MEANS FOR DYNAMIC MICRO-POSITIONING AND ALIGNMENT OF MEDIA

CROSS REFERENCE TO RELATED APPLICATION

This application is a continuation of U.S. patent application Ser. No. 10/683,626, entitled "DYNAMIC MICRO-POSITIONER AND ALIGNER", filed Oct. 10, 2003, now U.S. Pat No. 6,935,042, which is related to U.S. provisional patent application No. 60/424,741, filed Nov. 8, 2002, entitled IN SITU DYNAMIC FIBER ALIGNER. The entire contents of both applications are incorporated herein by this reference. The Applicants hereby claim the benefits of this earlier pending patent application and its related provisional application under 35 U.S.C. Section 19(e).

TECHNICAL FIELD

The present invention relates to one or a plurality of micro-positioners used to dynamically align, position or move media(s), mass(es), or component(s) and device(s) related thereto. Such media include, but are not limited to, one or a plurality of fibers, optical fibers, optical elements, tubes or wires, and such components include, but are not limited to, lenses, nozzles, valves, antenna elements and radio frequency ("rf") stubs. The micro-positioners can be positioned and secured inside a jacket or other self-contained housing adapted to receive and hold the media or securely hold the components. The micro-positioners may also be used to position materials within an integrated package, such as an optical package.

DESCRIPTION OF CONVENTIONAL ART

The conventional means of aligning a media or component is to statically align the media or component or the mount holding the media or component either passively or actively. Static or statically, refers to the inability to make adjustments to the media after the media and related elements are anchored. To align a media passively, small silicon workbenches are etched into a device using semiconductor technology. Piece parts are then placed upon the etched workbench and secured in place. In the foregoing case, the media could consist of optical fiber. The passive method requires that the optical fiber be precisely located and aligned to a mechanical feature, which can in turn be located in an etched groove within the workbench. The passive method has had limited alignment success because, in many cases, the relationship between the mechanical feature and the optical fiber is not sufficiently precise. Disadvantageously, no adjustment of the optical fiber is possible after placement and anchoring to the final location. The same considerations apply to media other than optical fiber.

Because of the cited disadvantageous of the passive method, the active method of aligning a media or component is more widely used. The active method uses complex equipment to move a media, typically an optical fiber, into alignment. The equipment then anchors the media, such as an optical fiber, using glue, solder or welding. While the active method is more precise, successful employment of the active method requires complex equipment and precise piece parts with extremely flat and smooth surfaces. Disadvantageously, manufacturing yields using the active method are typically low and rework of the assemblies is difficult. As in the case of passive alignment, active alignment is static.

The present invention comprises a dynamic micro-positioner used to position and/or align media or components and includes a variety of embodiments and applications thereof. The present invention can be used to position and/or align a media or components, such media including, but not limited to, one or a plurality of fibers, optical fibers, optical elements, tubes or wires, such components including, but not limited to, lenses and/or nozzles.

With reference to the conventional art, there are disclosed various conventional active and passive means of and apparatus for aligning media and components, typically optical elements and optical assemblies. The MEMS actuator disclosed in U.S. Pat. No. 6,114,794 to Dhuler et al., uses a silicon substrate upon which a bimetallic material is added. The method of fabricating the actuator of Dhuler applies a separate heater to expand the bimetallic member. Disadvantageously, the member of Dhuler is securely attached to the substrate such that only a minimum amount of displacement can be achieved. Dhuler further discloses a latch mechanism. However the latch is operable only to lock the optical element in a few discrete positions. In contrast to Dhuler, an embodiment of the present invention includes integral heaters to provide expansion and a locking mechanism to allow for a continuum of possible locked positions. Further, the mechanism of an embodiment of the present invention transitions through a sequence of alternating locking positions. This permits large movements, the integrated heaters providing a user defined step size.

The apparatus and method of optical switching disclosed in U.S. Pat. No. 6,381,382 B2 to Goodman et al., adds a composition on the sides of a fiber, longitudinally, which contracts or expands with an electrical signal. The invention of Goodman et al., is operable to bend fiber and thus align optics. Disadvantageously, the invention of Goodman et al., requires continuous electrical power to maintain alignment and uses piezoelectric and other materials. Because of local stresses on the fiber, polarization properties of the light signal may be affected. An embodiment of the present invention has integral micro-positioners to move media, such as optical elements, to a desired location. The present invention does not utilize longitudinal actuators attached to fiber, but rather uses a MEMS thermal actuator perpendicular to the fiber.

The mounting and alignment structure disclosed in U.S. Pat. No. 6,487,355 to Flanders discloses a passive alignment and static anchoring structure fine-tuned by flexion. The invention of Flanders does not permit dynamic anchoring. In contrast, the present invention permits active alignment of a media without flexion and permits dynamic anchoring of the media.

The fiber optic switching system and method disclosed in U.S. Pat. No. 4,696,062 to LaBudde consists of an optical switch that moves a lens relative to a fixed optical rod between ports to produce a switch wherein alignment is achieved by monitoring a reflection. In contrast, the fiber optic embodiment of the present invention uses free space between two collimators or combination of collimator and fiber.

The lens assembly disclosed in U.S. Pat. No. 6,374,012 B1 to Bergmann et al., utilizes a lens within the optical path which, when moved perpendicular to the optical path, causes a change in its pointing angle. The assembly requires external manipulators to move parts to their desired location and incorporates welding, adhesives, or solder to anchor the assembly into position. After anchoring, the elements cannot be further adjusted. In contrast, an embodiment of the present invention utilizes integral micro-positioners to move the elements, such as optical elements, into a desired location. The assembly of the present invention is self-locking in that when power is not supplied, the elements are anchored. Further, the present invention is dynamic in that at any point within the life of the product, power may be applied to move the media, such as a fiber or optical element, to a new setting.

The piezoelectric apparatus disclosed in U.S. Pat. No. 4,512,036 to Laor uses a piezoelectric component to bend a fiber thus aligning it. With the invention of Laor, if deformation occurs, then the anchoring is static. If not, then voltage must be maintained to secure alignment. The use of piezoelectric, disadvantageously, requires application and maintenance of high voltages to the piezoelectric element. An embodiment of the present invention uses integral micro-positioners to move media, such as optical fiber or optical components, into a desired location. Further, an embodiment of the present invention is self-locking such that when power is not supplied, the media, such as optical fiber or optical components, remain anchored.

The assembly disclosed in U.S. patent application Ser. No. 09/733,049 by Musk uses silicon machined mechanical parts as a means to locate and move optical elements relative to each other. The assembly requires external manipulators to move parts to a desired location and incorporates welding, adhesives, or glass re-flow to anchor the optical elements into position. Disadvantageously, anchoring is static in that after anchoring the alignment, media or elements cannot receive additional adjustment. An embodiment of the present invention has integral micro-positioners to move the media, such as optical fiber or optical elements, into a desired location. Further, the micro-positioners are self-locking. When power is not supplied to the present invention, the media, such as optical fiber or optical elements, are anchored, yet the present invention remains dynamic in that at any point during the life of the product, power may be applied to move the media to a new setting.

The method disclosed in U.S. Pat. No. 6,205,266 to Palen uses light coupled from the signal path to provide feedback allowing continuous adjustment of a fiber. This method is referred to as active alignment. The invention of Palen requires continuous power to maintain the position of the optical element. In contrast, an embodiment of the present invention allows periodic alignment, anchoring, and realignment, without the need for continuous power to the micro-positioner. Further, while the invention of Palen covers continuous alignment using optical feedback architecture, it does not include an anchoring mechanism, as does the present invention.

The apparatus disclosed in U.S. patent application Ser. No. 10/098,742 by Deck et al., applies interferometric methods to actively align and statically anchor optics using external manipulators. In contrast, an embodiment of the present invention uses internal micro-positioners, dynamic anchoring, and remains transparent to the method used to detect alignment errors.

None of the following references disclose a method and apparatus for dynamically aligning a media using integral micro-positioners that permit movement of a media, such as an optical fiber or optical element, into a desired location, the micro-positioner assembly being self locking. Further, none of the following disclosed references remain dynamic such that, at any point during the life of the product, power may be applied to implement a new desired setting, such alignment being possible in the field. For example, the method and apparatus disclosed in U.S. Pat. No. 6,244,755 B1 to Joyce et al., utilizes active alignment and static, not dynamic, anchoring using external manipulators and a metal bracket that is deformed to achieve alignment. The optical interface disclosed in U.S. Pat. No. 6,477,303 to Witherspoon uses V-groove technology to achieve passive alignment and static anchoring to facilitate optical backplanes. The invention of Witherspoon is focused on the optical interface between a circuit board and a main-board using micro-machining techniques to chemically etch paths in the substrate to facilitate self-alignment. The method and apparatus for aligning optical components disclosed in U.S. Pat. No. 6,480,651 B1, to Rabinski uses two stages. One stage is used to align the fiber and the second stage is used to adjust, maintain and lock the optical components about a virtual pivot point. The invention of Rabinski is used to align fiber arrays similar to that used in V-groove technology. The apparatus disclosed in U.S. Pat. No. 6,240,119 to Ventrudo uses a partial reflector and fiber grating in series with an optical beam to stabilize laser performance. The kinematic mount disclosed in U.S. Pat. No. 5,748,827 to Holl et al., consists of a passive alignment method using a two stage mountable module with a macro-stage and a micro-stage that further includes a fluid flow control channel. The coupling elements disclosed in U.S. Pat. No. 4,452,506 to Reeve et al., consists of an alignment algorithm and method of using light in a fiber buffer to determine the direction of movement of a fiber needed to achieve alignment. The electrostatic micro-actuator disclosed in U.S. Pat. No. 5,214,727 to Carr et al., uses an electrostatic actuator for moving a fiber in a switch application. The actuator is specifically designed in an H-shape. The method of Carr et al., restricts the size of motion and requires large enabling voltages. In contrast, an embodiment of the present invention uses a thermal expansion bar, which provides for both large and small step size movements at low voltages. The alignment apparatus disclosed in U.S. Pat. No. 4,474,423 also uses light in a buffer glass to align fibers for use, for example, in splicing applications. The polarization state changer and phase shifter disclosed in U.S. patent application Ser. No. 10/150,060 by MacDonald utilizes a method whereby stress is applied to a wave-guide to shift phase or modify the polarization state. The method and system for attenuating power in an optical signal disclosed in U.S. patent application Ser. No. 09/796,267 by Cao et al., utilizes MEMS mirrors in a variable optical attenuator. The structures disclosed in U.S. patent application Ser. No. 10/072,629 by Hsu et al., provides a means of compensating for thermal effects and stress through flexible symmetry. The apparatus and method disclosed in U.S. patent application Ser. No. 09/775,867 by Miracky uses an electrostatic actuator that moves a lens-using comb drive for the actuator for optical lens movement.

In "Surface Micro-machined 2D Lens Scanner Array", Proc. IEEE/LEOS Optical Mems., by H. Toshiyoshi, G. D. J. Su, J. LaCosse, and M. C. Wu ("Toshiyoshi"), an apparatus that uses a stepping motion to move a lens into alignment with another optical device is described. Disadvantageously, the apparatus of Toshiyoshi requires significant voltage to move a comb with etched steps in micrometer step increments. An embodiment of the present invention uses integral micro-positioners to move the optical components to a desired location using a thermal expansion bar. The micro-positioner of the present invention can move media, or components, in very small or large steps and can lock the media or component into position when power is not applied. The present invention overcomes the disadvantages of the passive and active alignment methods by providing an inexpensive, dynamic means to align media, such as optical fibers or optical elements, or components. The present invention permits adjustment and alignment of the media or components during subsequent assembly steps and after deployment within a network or apparatus.

The apparatus disclosed in U.S. patent application Ser. No. 3,902,084 by May discloses a piezoelectric inchworm motor that provides precision motion in one direction. The device does not provide two-dimensional motion, as does the present invention, and is designed to move a cylindrical shaft parallel to piezoelectric actuators. Such a configuration is not suitable in size or orientation to perform the function of an in situ dynamic aligner. In contrast, an embodiment of the present invention uses internal micro-positioners with dynamic anchoring configured for in-situ applications requiring control in a plurality of dimensions.

The apparatus disclosed in U.S. Pat. No. 6,380,661 by David A. Henderson, also defines a piezoelectric inchworm motor with one dimension operation. The invention uses interdigitated ridges made using MEMS technology and alternating clamping to make linear movements. To maintain a load electrical power must be applied. The present invention permits movements in a plurality of dimensions, does not require power when holding a load, and provides a small configuration compatible with in-situ applications.

BRIEF DESCRIPTION OF THE INVENTION

The use of fiber optics in telecommunication applications requires the alignment of various optical elements to extremely low tolerances in the range of 0.1 micron. These low tolerances have not previously been encountered in commercial manufacturing. Achieving such low tolerances in alignment of optical fibers and related components requires costly equipment and long manufacturing cycles of optical components. An embodiment of the present invention comprises a component that can achieve low alignment tolerances, while accomplishing optical input/output ("I/O") objectives. Further, an embodiment of the present invention satisfies a need to dynamically control and tune optical power.

Critically low tolerances are required between optical fiber lenses or other optical elements such as planer components. These low tolerances are difficult to achieve in volume manufacturing. An embodiment and application of the present invention which comprises an optical aligner and collimator provides a dynamic means to achieve precise, low alignment tolerances and further provides a means to power tune an optical fiber during the life of the component. One embodiment of the present invention comprises a micro-positioner to align and manipulate an optical fiber, the entire assembly adapted to be positioned in a self-contained housing or in an integrated assembly. Depending on the application, a lens and/or jacket, including a hermetic jacket, may be included as part of the self-contained housing. Lenses can be used on the end of the self-contained housing when an application requires beam conditioning. A metal jacket, case, or package can further be used, as necessary to encapsulate the device, facilitate mounting, and/or provide hermetic sealing.

In one embodiment of the present invention, a micro-positioner moves a media or component, such media including, but not limited to, one or a plurality of fibers, optical fibers, optical elements, tubes or wires, such components including, but not limited to, lenses or nozzles media, in one dimension. In another embodiment of the present invention, a micro-positioner moves a media or component, such media including, but not limited to, one or a plurality of fibers, optical fibers, optical elements, tubes or wires, such components including, but not limited to, lenses or nozzles media, in at least two dimensions in the plane of the micro-positioner.

An application of the one-dimensional or two-dimensional embodiment of the present invention is as a dynamic collimator. Another application of the one-dimensional or two-dimensional embodiment of the present invention is as a dynamic fiber aligner. A dynamic fiber aligner is similar to a dynamic collimator but the dynamic fiber aligner does not employ a collimating lens. In either of the foregoing applications of the present invention, a dynamic collimator or dynamic fiber aligner is attached to an optical component package by soldering, welding, epoxy or other means. Unlike with conventional collimators or fiber aligning methods, attachment tolerances of the present invention are less critical since the micro-positioner of the present invention is dynamic and may be adjusted electronically to achieve the desired alignment. Active adjustment of the media or component in the present invention is accomplished by applying electrical signals or pulses comprising current through, or a voltage across, micro-positioner arms in certain control sequences to define the direction and distance of the motion of the optic fiber or other media in one or two dimensions. The amplitude or duration of the electrical signals, or pulses, can be used to define the distance traveled. When a signal is not applied, the micro-positioner is locked into position to ensure anchoring at the desired location. An embodiment of the micro-positioner of the present invention is constructed using semiconductor technology. This micro-positioner takes advantage of the measurable thermal expansion characteristics of its expansion bars to cause movement, and hence, positioning and/or alignment, of the media or components. Each expanding, or contracting, expansion bar(s), has a set of corresponding clamps on the ends thereof, and the operation thereof creates a precision stepping motion. At least one expansion bar is required for each degree of freedom desired. Since power dissipated in an expansion bar is proportional to the square of voltage applied, and since thermal expansion is linearly dependent upon power dissipation, expansion or step size is proportional to the square of applied voltage. Thus, the invention has the ability to make large steps, in micrometers, and small steps, in nanometers.

Several embodiments of the present invention disclosed herein disclose the use of semiconductors to implement the expansion bars, however, the use of thermal expansion bars can be realized using small mechanical parts assembled without using semiconductor technologies. The micro-positioner of the present invention can be implemented using microelectromechanical systems ("MEMS") technology, where in the micro-positioner, the expansion bar is replaced with silicon etched gears and/or racks. Alternatively, the present invention can be implemented with piezoelectric or other material that expands with application of electrical current or voltage to effect movement.

BRIEF DESCRIPTION OF THE FIGURES

FIGS. 18 and 19 set forth performance and maximum fiber force calculation for an optical fiber embodiment of the present invention.

DETAILED DESCRIPTION OF THE INVENTION

Figure 1:
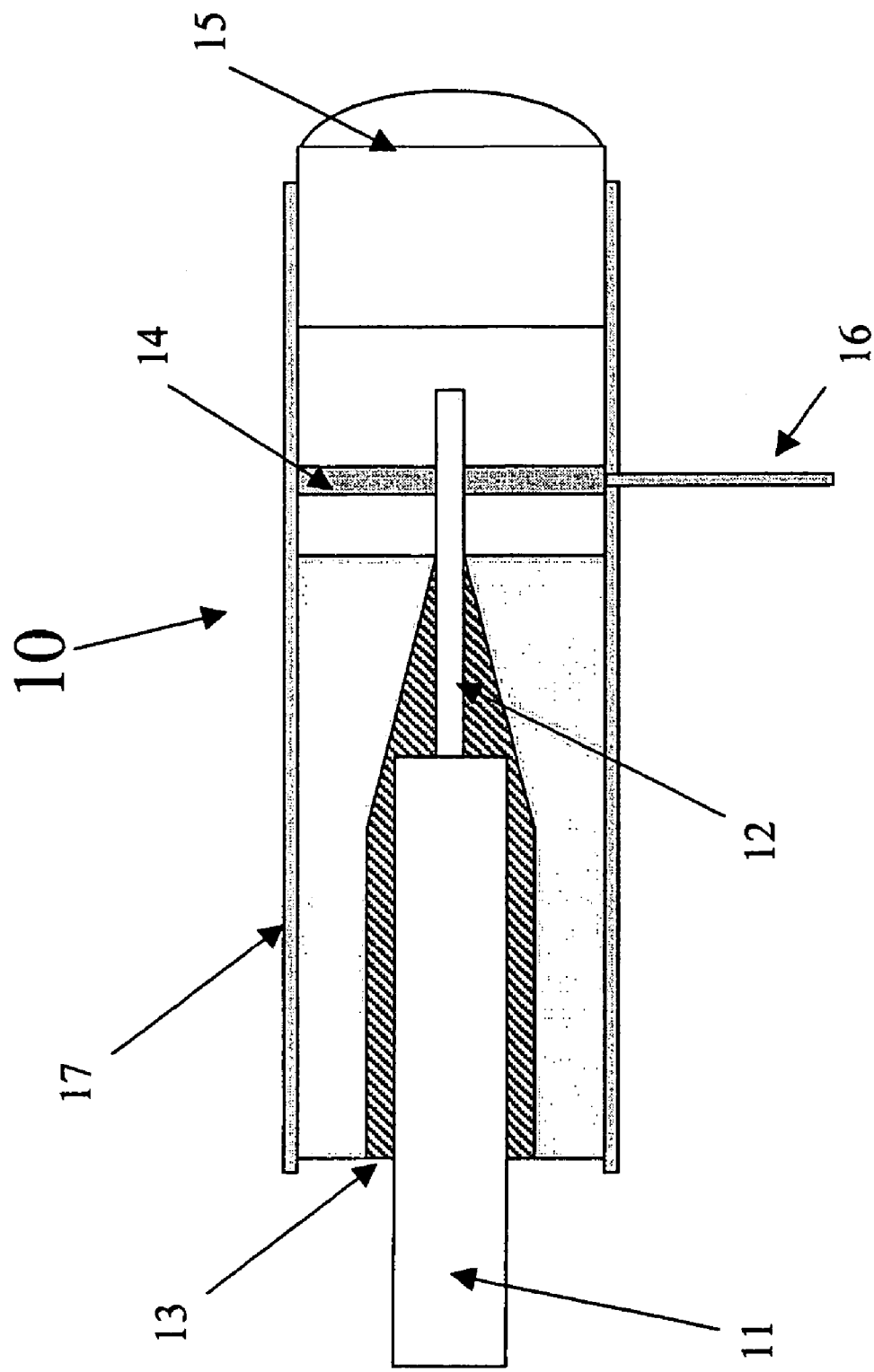
FIG. 1 illustrates schematically a cross-section of a single channel dynamic collimator wherein the micro-positioner moves an optical fiber.

An advantage of the present invention is that each media or component, such as an optical fiber or lens, is independently adjustable. When used with optical fiber, the present invention is operable to permit independent optimization of the throughput light. The jacket or other outer housing of the present invention can be constructed using conventional microelectronic and optical packaging technology and standard sizes. The embodiment of the present invention used with optical fiber can be enclosed such that the fiber guide and micro-positioner are positioned in a jacket. Control, or electrical leads pass through apertures in the jacket or housing so that the micro-positioner therein may be adjusted electrically.

Embodiments of the present invention used in optical fiber applications may also utilize a lens or lens assembly. Lenses are used when beam conditioning of the light is desired. Such embodiments of the present invention may be enclosed in jackets or housings. In each optical fiber embodiment, a micro-positioner that adjusts the fiber or other media or lens in at least one dimension is required. In optical applications, critical tolerances are required between the optical fiber and lens or, as in the case where lenses are not required, between the optical fiber and other optical elements such as planar components. Optical fibers and fiber guide are enclosed within the jacket or housing using adhesives or other suitable attachment means. The optical fiber embodiments of the present invention can be constructed such that the optical fiber or other media is stationary and the component, such as the lens, is adjusted by the micro-positioner. In such case, the fiber does not pass through the micro-positioner, but the component, such as the lens, is mounted on the micro-positioner. The appearance and size of the jacket or housing enclosing the present invention are similar to collimators conventionally available, although, as noted, the present invention has control or electrical leads extending through the jacket or housing.

The micro-positioner is a multi-dimensional device, which, when electrically activated, moves the media or component in steps of variable step size from a few micrometers to a few nanometers in the desired direction. In an embodiment of the present invention, an exposed end of the optical fiber is threaded through a movable mount located on a shuttle subassembly of the micro-positioner. As the movable mount moves in an X-Y direction, the exposed end of the optical fiber bends. The optical fiber sheath proximate to the exposed end of the optical fiber is firmly attached to a fiber guide within the jacket or housing. Distances between the micro-positioner and fiber guide are very large as compared to the micro-positioner movement so that the change in optical fiber to lens distance is not significant and micro-bending losses are not of concern. In operation, a computer algorithm is used to compute and send control signals to the micro-positioner to achieve the desired positioning and/or alignment of the optical fiber. For purposes of this application and the claims herein, reference to movement in the X-Y direction shall be deemed to include movement measured in a polar coordinate system, such as (r, theta) e.g., radius from an origin, and degrees of rotation from an axis.

The optical fiber embodiment of the present invention is operable to define a collimating light path. Advantageously, the present invention adds no optical elements through which the light must traverse. As such, there is no impact upon optical dispersion or polarization. Implementation of the micro-positioner requires no additional surface area or volume within a conventional collimator package. The device enclosing the micro-positioner appears as a collimator with leads. Employment of the present invention only requires replacement of a conventional collimator or fiber anchor apparatus.

FIG. 1 illustrates a single channel dynamic collimator 10 embodiment and application of the present invention. As seen therein, the device consists of a conventional buffered fiber that has been stripped of the buffer 11 exposing the optical fiber 12. The buffered fiber 11 and optical fiber 12 are inserted into fiber guide 13 that aligns the bare optical fiber 12 so it may be inserted into the movable mount of micro-positioner 14. The micro-positioner 14 is operable to move the optical fiber 12 with precision in two dimensions, Y, which is vertically, and X, which is in and out of the plane of the paper, and lock the optical fiber 12 in place after movement. The buffered fiber 11, optical fiber 12, and fiber guide 13 are securely fastened either mechanically, with epoxy, or with other adhesives into the collimator jacket 17 to provide strain relief. A collimating lens 15, as is required for optical properties, is attached using a hermetic material such as solder and electrical leads 16 are passed through the jacket 17 to permit control or electrical connections to the micro-positioner 14.

Figure 2:
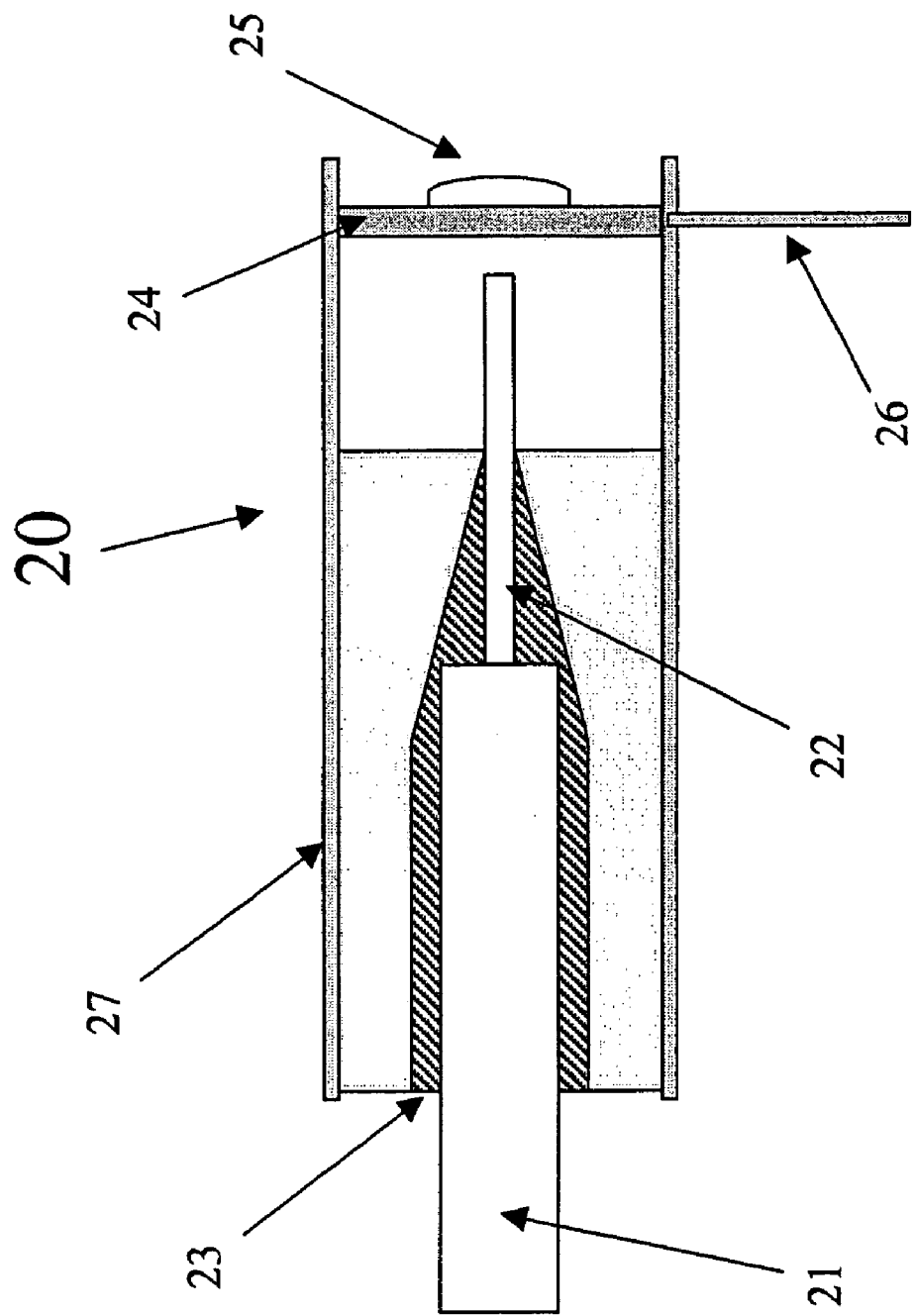
FIG. 2 illustrates schematically a cross-section of a single channel dynamic collimator wherein the micro-positioner moves the lens.

FIG. 2 also illustrates a single channel dynamic collimator 20 embodiment and application of the present invention, however, the optical fiber 22 is held stationary and the lens 25 is mounted to the micro-positioner 24 to permit positioning and/or alignment. As seen therein, the device consists of a conventional buffered fiber 21 that has been stripped of the buffer exposing the optical fiber 22. The optical fiber 22 is inserted into a fiber guide 23 that aligns the bare optical fiber 22. The micro-positioner 24 moves the lens 25 with precision in two dimensions, Y, which is vertically, and X, which is in and out of the plane of the paper, and locks the lens 25 in place after movement. The buffered fiber 21, optical fiber 22, and fiber guide 23 are securely fastened either mechanically, with epoxy, or with other adhesives into the collimator jacket 27 to provide strain relief. A collimating lens 25 is attached as is required for optical properties to the micro-positioner 24 and electrical leads 26 are passed through the jacket 27 to permit control or electrical connections to the micro-positioner 24.

FIG. 3(a) illustrates a side view of a multiple channel dynamic aligner/collimator with N×M channels wherein micro-positioners of the present invention adjust and/or align the optical fibers. As seen therein, the device consists of a conventional buffered optical fiber ribbon 31 that has been stripped of the buffer exposing a plurality of optical fibers 32. The optical fibers 32 are inserted into a fiber guide 33 that aligns the bare optical fibers 32 so they may be inserted into the N×M micro-positioners 34. The micro-positioners 34 can individually move the optical fibers 32 with precision in two dimensions, Y, which is vertically, and X, which is in and out of the plane of the paper, and individually lock the optical fibers 32 or component positions in place after movement. Glass seal 39 may be added to provide a fiber seal. Light exits optical fibers 32 through free space through lens array panel 35. The buffered optical fiber ribbon 31, optical fibers 32, and guide 33 are securely coupled either mechanically or with epoxy 38 into the collimator jacket 37 to provide strain relief. A collimating lens array panel 35 is attached as is required for optical properties and electrical control leads 36 are passed through the jacket 37 to permit electrical connections to the micro-positioner 34.

FIG. 3(b) illustrates a front view of an N×M array of FIG. 3(a). More specifically, FIG. 3(b) illustrates an 8×8 optical fiber array embodiment of the present invention. As seen therein control leads 36 extend from jacket 37. Light from the terminating end of each individual optical fiber traverses its correlating lens of lens array panel 35.

Figure 3:
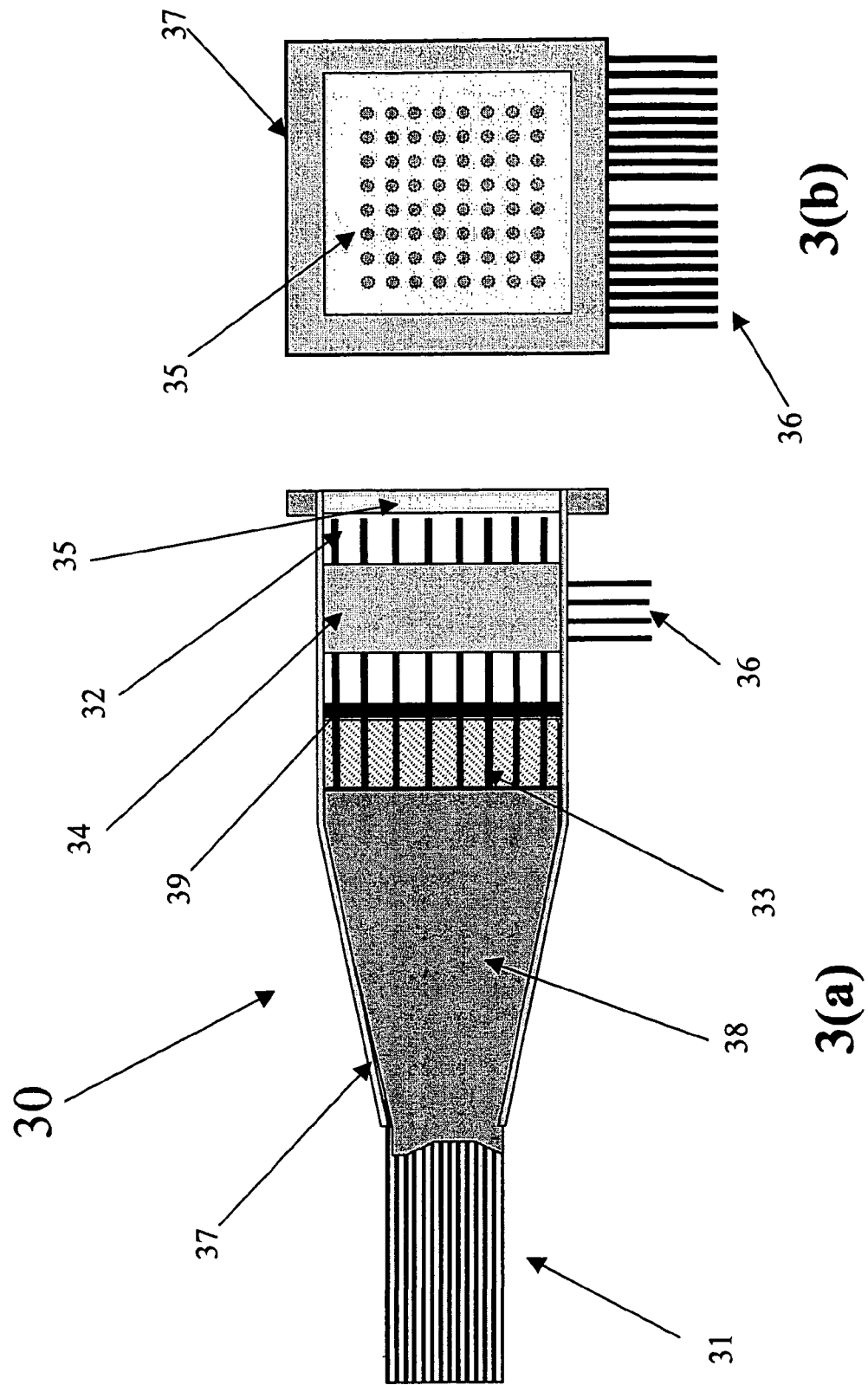
FIG. 3(a) illustrates a side view of a multiple channel dynamic aligner/collimator with N×M channels wherein micro-positioners of the present invention adjust and/or align optical fibers independently.
FIG. 3(b) illustrates a front view of the N×M array of FIG. 3(a).
Figure 4:
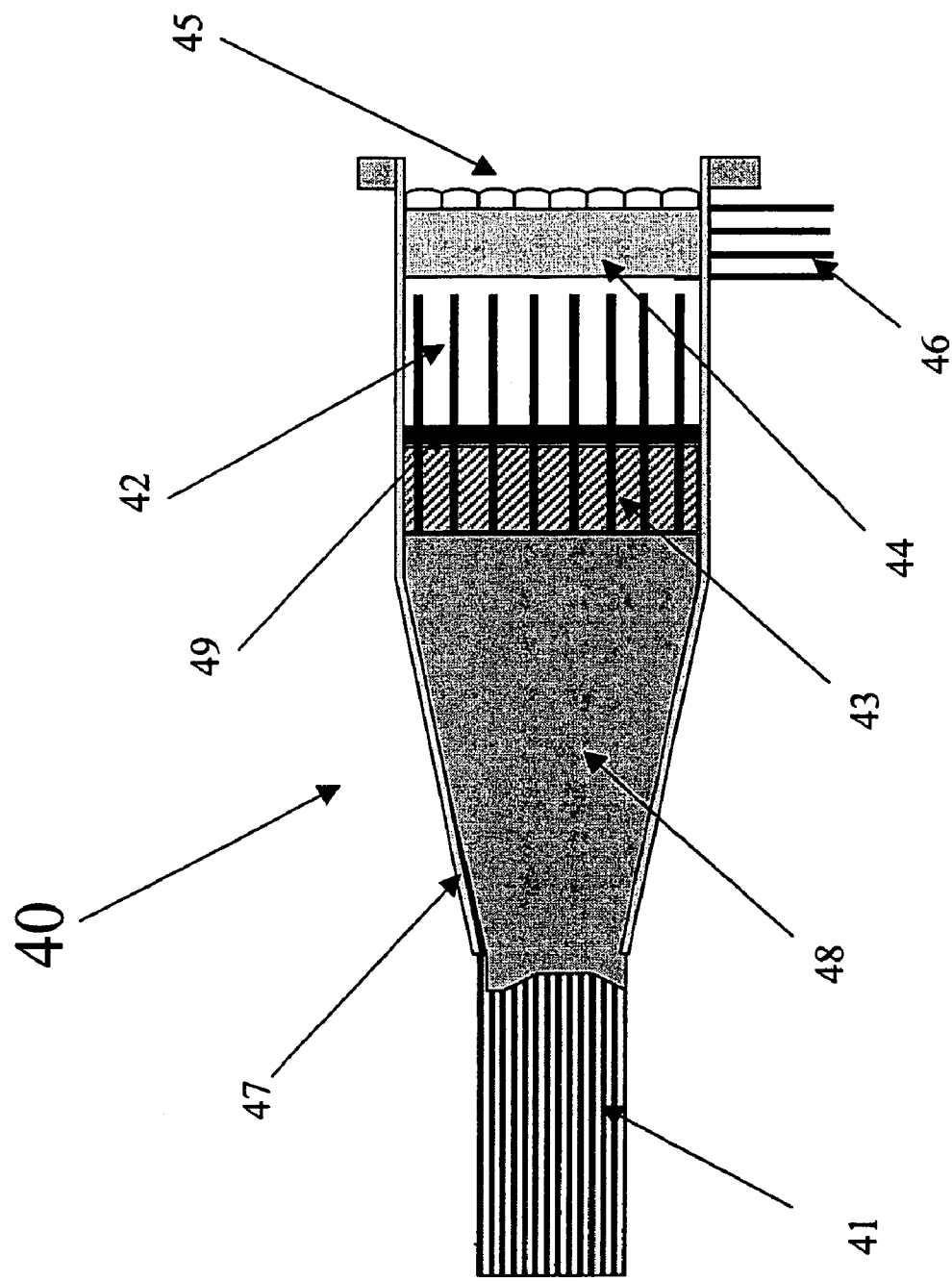
FIG. 4 illustrates schematically a cross-section of a multiple channel dynamic collimator/aligner with N channels in one direction and M in the other wherein the micro-positioner moves the lenses independently.

FIG. 4 shows a multi-optical fiber configuration similar to that of FIG. 3, however the embodiment comprises a plurality of collimators arranged in an array and an array of single lenses. As seen therein, the device consists of a conventional buffered optical fiber ribbon 41 that has been stripped of the buffer exposing a plurality of optical fibers 42. The optical fibers 42 are inserted into optical fiber guide 43 that aligns the bare optical fibers 42. Each micro-positioner 44 of a N×M micro-positioner array adjusts and/or aligns an individual lens 45 with precision in two dimensions Y, which is vertically, and X, which is in and out of the plane of the paper and individually locks each lens 45 in place after movement. The buffered optical fiber ribbon 41, optical fibers 42, and optical fiber guide 43 are securely coupled either mechanically or with epoxy into the collimator jacket 47 to provide strain relief. Each collimating lens 45 is mounted on an individual micro-positioner 44 and electrical leads 46 are passed through the jacket 47 to permit control or electrical connections to each micro-positioner 44 of the N×M micro-positioner array.

Figure 5:
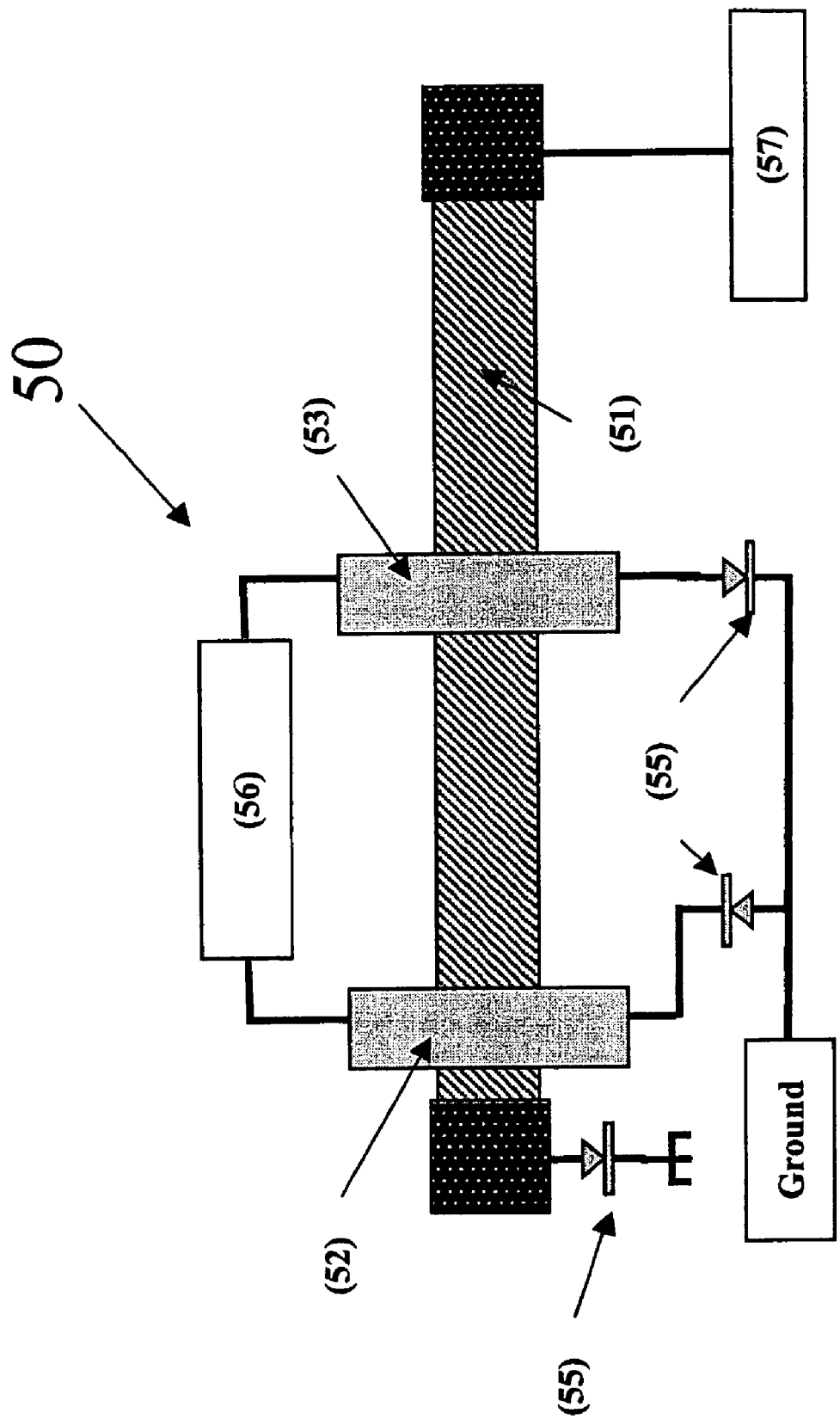
FIG. 5 illustrates the concept of electrical operation of a one dimensional micro-positioner expansion bar.
Figure 6:
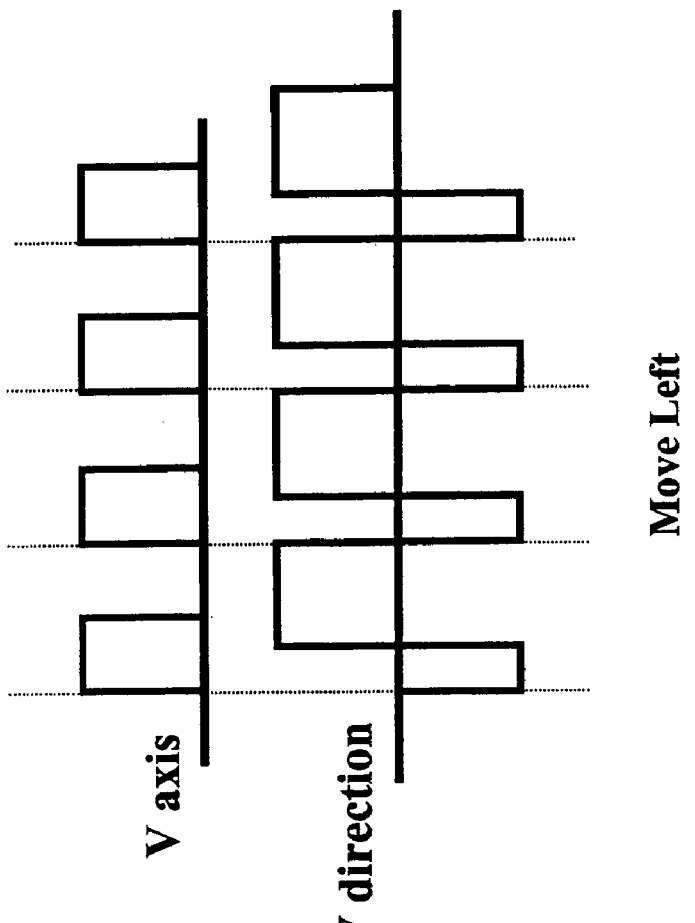
FIG. 6 illustrates a pulse train showing typical control signals to the micro-positioner expansion bar for right movement.
Figure 7:
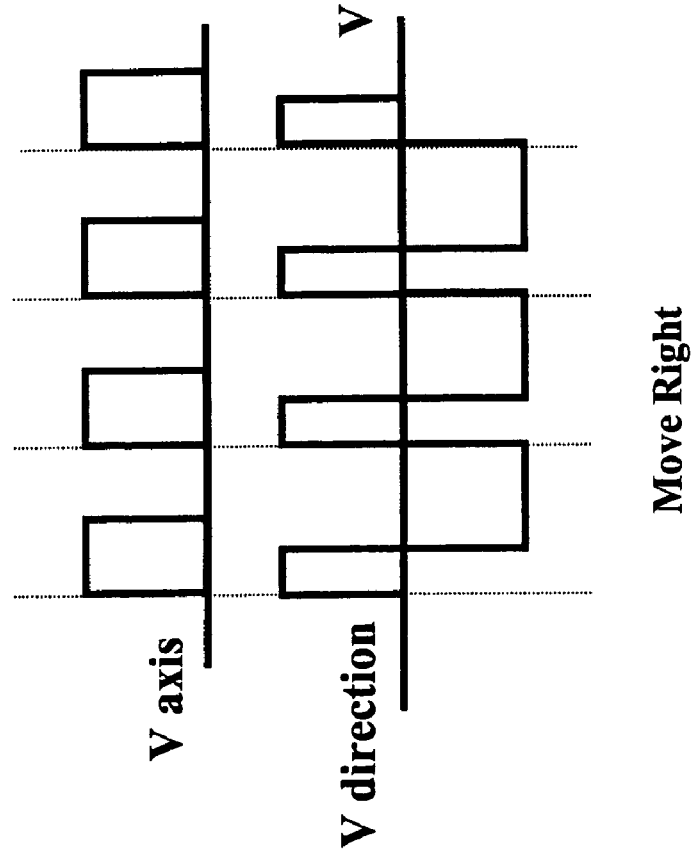
FIG. 7 illustrates a pulse train showing typical control signals to the micro-positioner expansion bar for left movement.

FIG. 5 illustrates the electrical operation of a one-dimensional micro-positioner 50. As seen therein, when a positive voltage is applied to the direction terminal 56, the right clamp 53 opens as current flow is determined by diodes 55. If an additional positive voltage is applied to the axis terminal 57, then heat is dissipated in the expansion bar 51 by heating resulting from current flow in expansion bar 51 or by current flow through resistors (not shown) coupled to expansion bar 51, results in the expansion bar 51 expanding to the right since clamp 52 is closed. Reversing the voltage on the direction terminal 56 causes the left clamp 52 to open and the right clamp 53 to close. This holds expansion bar 51 to the right as the expansion bar cools. Voltage to direction terminal 56 is removed and both clamps 52 and 53 are closed locking the bar into position. The bar has moved one step in the right direction. Thus, the sequence and polarity of voltage applied to axis terminal 57 and directional terminal 56 of FIG. 5, in the manner shown in FIG. 6, will result in the movement of the expansion bar 51 of FIG. 5 to the right. The sequence and polarity of voltages applied to axis terminal 57 and directional terminal 56 of FIG. 5, in the manner shown in FIG. 7 will result in the movement of expansion bar 51 of FIG. 5 to the left.

Clamps 52 and 53 of FIG. 5 used to hold the expansion bar can also be thermally activated. When no voltage is applied, the clamp, a conductive band, fits tight over the expansion bar. This clamping function can be achieved with various implementations. When voltage is applied to the clamp, the clamp expands and releases the expansion bar. Each time the voltage cycles the expansion bar steps in the direction defined by the direction voltage polarity. The size of the step is proportional to the square of the axis voltage applied as seen in Equation 1 below. Thus, the micro-positioner will make large steps for high voltages and small or fine adjustments for low voltages. This allows for minimum alignment times as well as fine resolution. As can be seen from Equation 1, the constant of proportionality is a function of material properties and configuration.

$$S = \alpha L \frac{\theta}{R} V^2$$

$S$ = step for each voltage pulse $\alpha$ = Coefficient of thermal expansion $L$ = Length of actuator (Clamp to Clamp)

$\theta$ = Thermal resistance $R$ = Electrical resistance $V$ = Applied Voltage

Equation 1—Step Size

In operation, the expansion bar must be allowed to heat and cool. The time constant for these transisitons is given in Equation 2 below In practice the bar will cool faster than equation 2 predicts, since equation 2 considers thermal conductivity only when in practice, thermal convection will also occur.

$$\lambda = \theta d C_t L W T$$

$\lambda$ = Time constant $C_t$ = Specific Heat d = Density

W = Width of expansion bar

L = Length of expansion bar

T = Thickness of expansion bar $\theta$ = Thermal Resistance

Equation 2—Time Constants

Equations 1 and 2 predict the step length versus voltage and time. Thus, expansion bar motion may be defined as follows for the heating cycle and for the cooling cycle as follows:

During heating:

$$S_H = \alpha L \left(\frac{V^2}{\rho}\right)\left(\frac{1}{K}\right)\left(1 - e^{-\frac{t}{\lambda}}\right)$$

During cooling $$S_C = S_H \left(e^{-\frac{t}{\lambda}}\right)$$

Where the symbols are as above in Equations 1 and 2 and $S_H$ is heating step size, $S_C$ is cooling step size, K is thermal conductivity and $\rho$ is electrical resistivity.

Employing an expansion bar in two dimensions requires two expansion bars but adds the complication that each expansion bar must have two degrees of freedom. One degree of freedom is needed to accomplish controlled movement and the second is needed to allow free movement in the orthogonal direction.

Figure 8A:
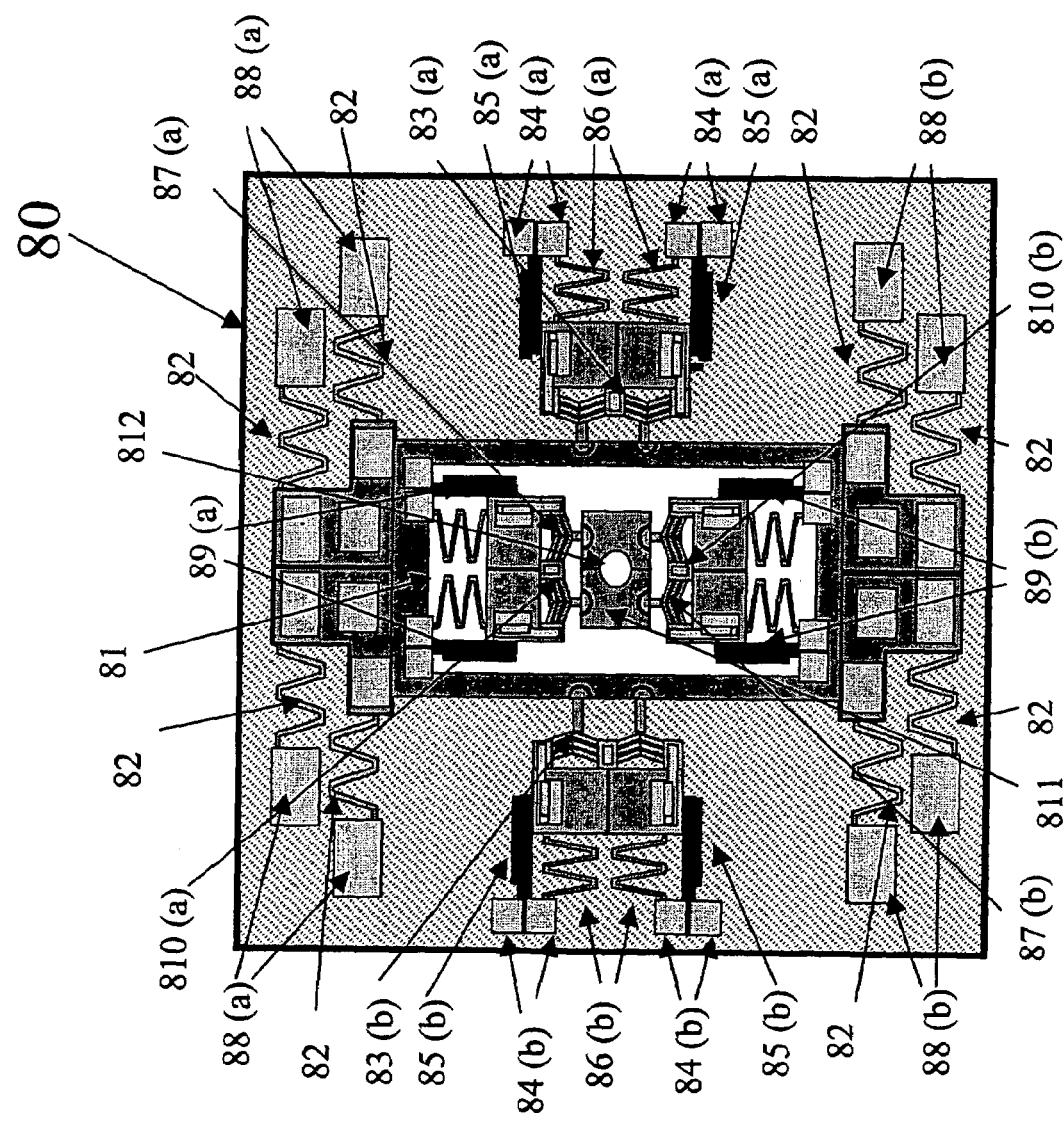
FIG. 8(a) is a top view of a first embodiment of the micro-positioner assembly of the present invention.

FIG. 8(a) is a top view of a first embodiment of the micro-positioner 80 of the present invention. As seen therein, micro-positioner 80 is comprised of the following subassemblies, components and elements: shuttle 81, shuttle springs 82, x-axis expansion bars 83(a) and 83(b), x-axis bond pads 84(a) and 84(b), x-axis clamps 85(a) and 85(b), x-axis expansion springs 86(a) and 86(b), y-axis expansion bars 87(a) and 87(b), y-axis bond pads 88(a) and 88(b), y-axis clamps 89(a) and 89(b), y-axis expansion springs 810(a) and 810(b), movable mount 811, and movable mount aperature 812. In one embodiment of the present invention, the foregoing components and elements are comprised of semiconductor material. The shuttle 81 of micro-positioner 80 is adapted to move in the X direction. Shuttle 81 is attached to micropositioner 80 with eight shuttle springs 82 and the shuttle 81 is adjusted or aligned in the X direction by two expansion subassemblies FIG. 8(b). Within shuttle 81 are two expansion subassemblies, one for movement in the positive Y direction and one for movement in the negative direction. The X direction expansion subassembly consists of x-axis expansion bars 83(a) and 83(b), two sets of thermal actuated x-axis clamps 85(a) and 85(b) and two sets of x-axis expansion springs 86(a) and 86(b). The Y direction expansion subassembly consists of y-axis expansion bars 87(a) and 87(b), two sets of thermal actuated y-axis clamps 89(a) and 89(b) and two sets of y-axis expansion springs 810(a) and 810(b). Associated with each expansion assembly are a set of bond pads to which electrical connections can be made to the expansion bars and clamps. In the X direction, these comprise bond pads 84(a) and 84(b) and in the Y direction these comprise bond pads 88(a) and 88(b). External analog or logic circuitry (not shown) are coupled to micro-positioner 80 via these bond pads.

The micro-positioner 80 can be manufactured as a silicon chip and can be implemented in one or two-dimensional arrays. Alternating the clamping and unclamping of directional clamps as associated expansion bars are powered by the drive stepping motion.

Figure 8B:
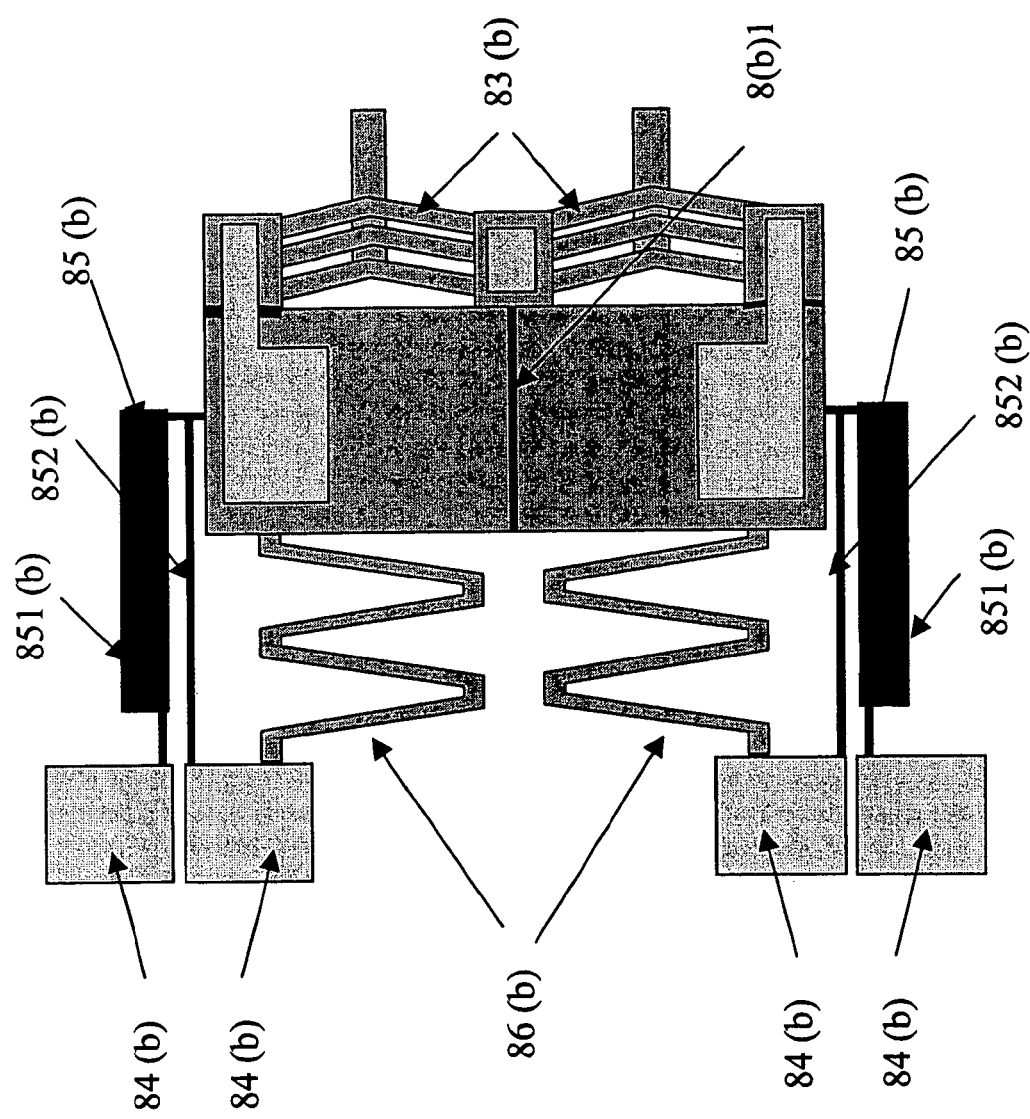
FIG. 8(b) is an exploded view of a spring, clamp, expansion bar subassembly of the first embodiment of the micro-positioner of the present invention.

FIG. 8(b) is an exploded view of x-axis expansion assembly consisting of springs 86(b), x-axis clamps 85(b), legs 851(b) of x-axis clamps 85(b), and x-axis expansion bars 83(b) of the micro-positioner 80 of FIG. 8(a). The other x-axis expansion subassembly and the y-axis subassemblies are substantively similar to the subassembly of FIG. 8(a), except for their directional orientation. In operation, a voltage differential is introduced across bond pads 84(a). This causes a current to flow through leg 851(b) and leg 852(b) of x-axis clamp 85(b). Due to the size difference in the two legs, leg 852(b) has more resistance than leg 851(b), causing leg 852(b) to heat up more and thus expand. This in turn causes the x-axis clamp 85(b) to bend and open up. This effect is characteristic of any homogeneous material such as silicon of which the x-axis clamp 85(b) is made. Pressure between the clamp 85(b) and the outer edge of x-axis expansion bars 83(b) disengage when x-axis clamp 85(b) bends outward. Similar effects can be caused by introducing voltage potentials at the bond pads of the other expansion subassemblies of micro-positioner 80. Referring back to FIG. 8(a), when current flows through x-axis clamp 85(b) it opens while x-axis clamp 85(a), without current, is closed. Simultaneously, current can be introduced through x-axis expansion bars 83(a) to cause them to expand, thus moving the shuttle assembly 81 to the left. Soon thereafter, current flow is stopped through x-axis clamp 85(b) whereby x-axis clamp 85(b) cools and retracts to its original position. Clamp 85(b) applies pressure to the outer edge of x-axis expansion bars 83(b) re-engaging and locking the x-axis expansion bars into place once x-axis clamp 85(b) has cooled. Clamp 85(a) is opened as is claim 85(b) and the current through expansion bar 83(a) is stopped. After expansion bar 83(a) cools, current to clamp 85(b) is removed and the shuttle 81 is locked into place. Similar operation and timing of this procedure on x-axis clamps 85(a), 85(b) and x-axis expansion bars 83(b) causes movement of shuttle 81 to the right. Operation and timing of this procedure on y-axis clamps 89(a), and 89(b) and y-axis expansion bars 87(a) and 87(b) causes movement of movable mount 811 downward. Operation and timing of this procedure on y-axis clamp 89(b), 89(a) and y-axis expansion bars 87(b) causes movement of movable mount 811 upward. When a terminated end of a media is threaded through aperture 812 and secured to movable mount 811, the movement of shuttle 81 and or movable mount 811 moves the terminated end of the optical fiber.

Figure 9:
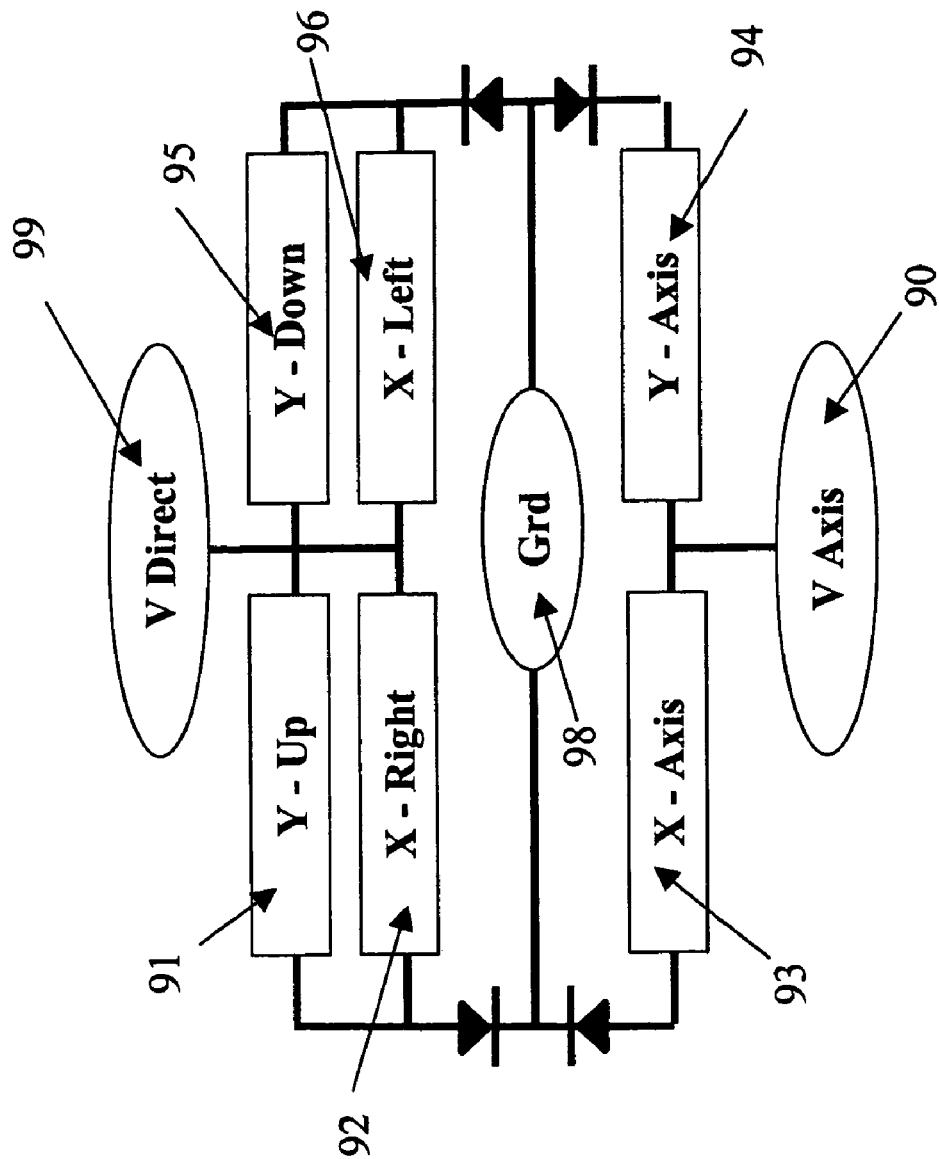
FIG. 9 is a schematic of the electrical operation of a two-dimensional micro-positioner of the present invention.

FIG. 9 is a schematic of the electrical operation of the two-dimensional micro-positioner of the present invention. As seen therein, by controlling polarity and sequence of input voltages 99 and 90, the direction and axis of motion are determined. By controlling voltage amplitude of 90, step size is determined and the number of voltage pulse determines distance moved. If a positive voltage is applied at 99, current flows through Y-up 91 and X-right 92 to ground 98. In other words, current is directed through the up clamps and the right clamps, so those clamps open up. If, then a positive voltage is applied at 90, current flows through the X-axis expansion bar 93 and causes movement along the X right direction. If a negative voltage is applied at 90, current flows through the Y-axis expansion bar 94 and causes movement in the Y-up direction. After expansion, the voltage is reversed at 99 so that the appropriate clamps close or open to prevent movement after removal of voltage at 90 and cooling of the expansion bar. When the expansion bar cools, all voltages are removed to lock the axis in place. Similar operation, with reverse sequence at terminal 99 and negative voltage applied at terminal 90, will provide motion of the y-axis down and with 90 positive, x-axis movement in the left direction occurs.

Another embodiment of the present invention uses heaters attached to the expansion bar to cause the adjustment of the micro-positioner. The step size is controlled by the thermal expansion, thermal conductance and electrical resistivity properties of the expansion bar. Application of a heater to the expansion bar increases the types of material that can be used as the expansion bar. For an example, titanium carbide can be used as it has expansion and thermal conductivity advantages over other types of materials. Tantalum nitride resistor elements can be used to provide heat. This combination provides similar step size control and significantly increases micro-positioner speed.

Figure 10:
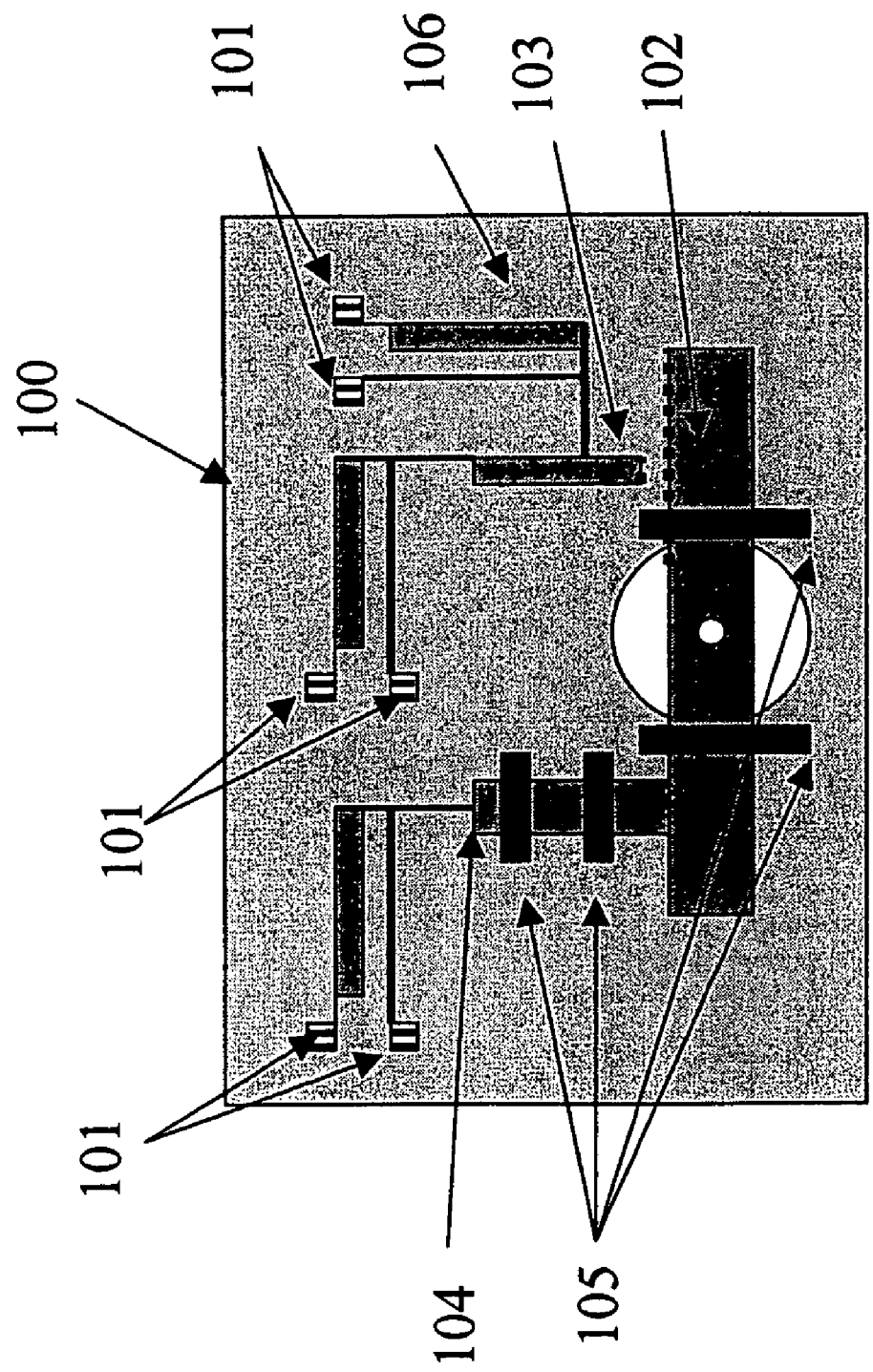
FIG. 10 is a top view of a MEMS-based stepping and clamping mechanism for the X-translation stage of a micro-positioner of the present invention.
Figure 11:
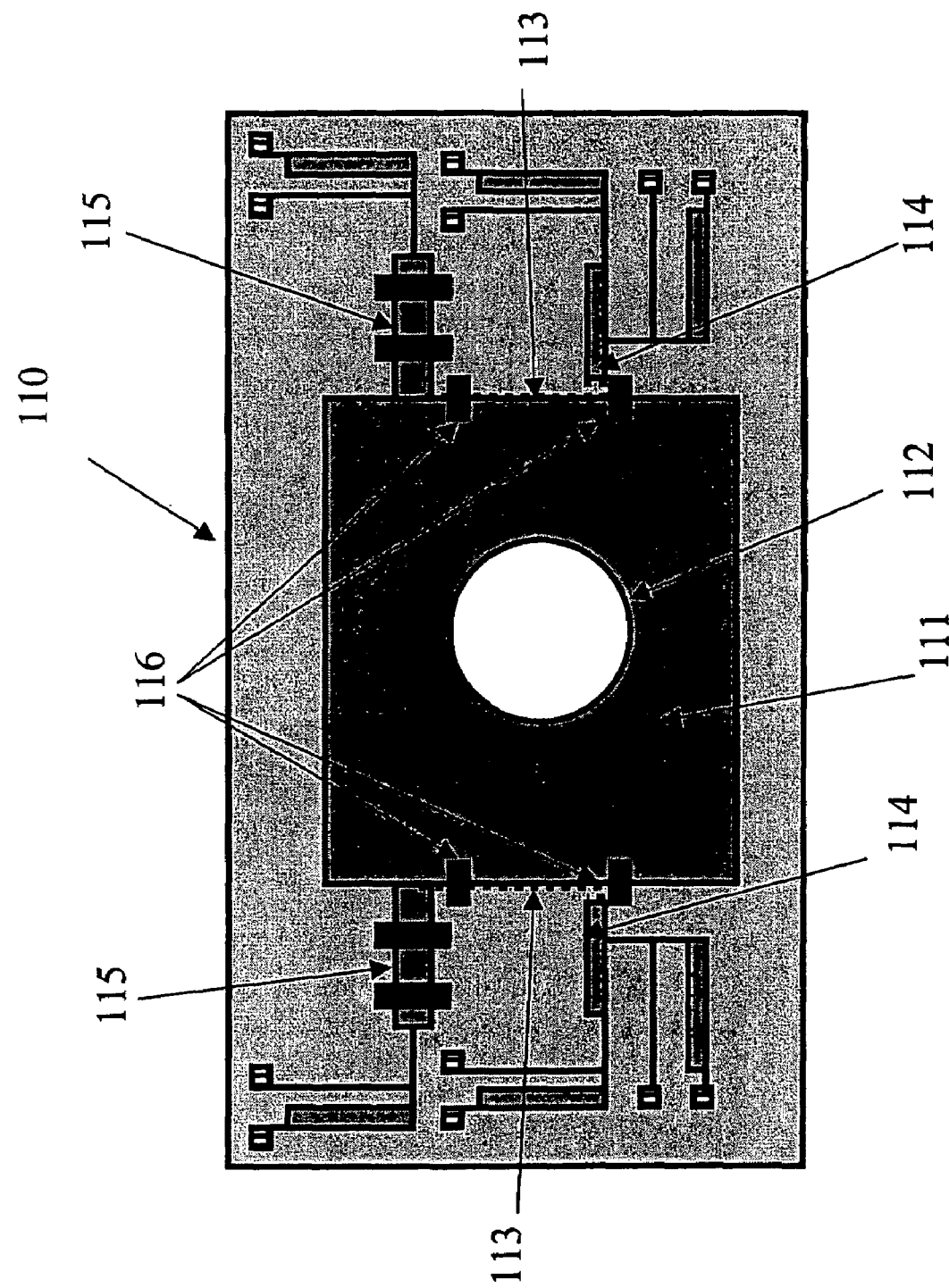
FIG. 11 is a top view of a MEMS-based stepping and clamping mechanism for the Y-translation stage of a micro-positioner of the present invention.
Figure 12:
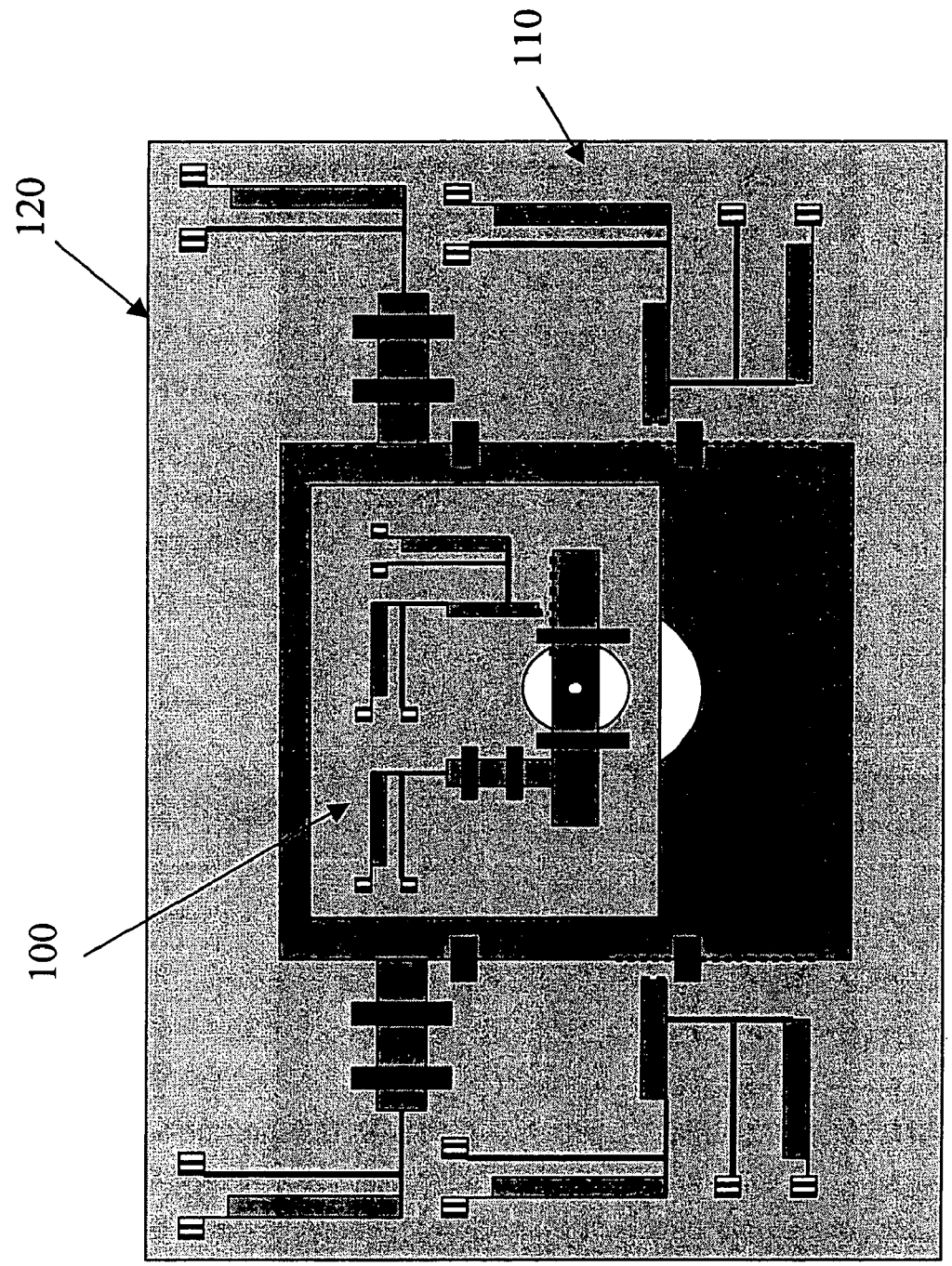
FIG. 12 is a top view of the integrated stepping and clamping mechanism for the X-Y precision translation stages of a micro-positioner of the present invention.
Figure 13:
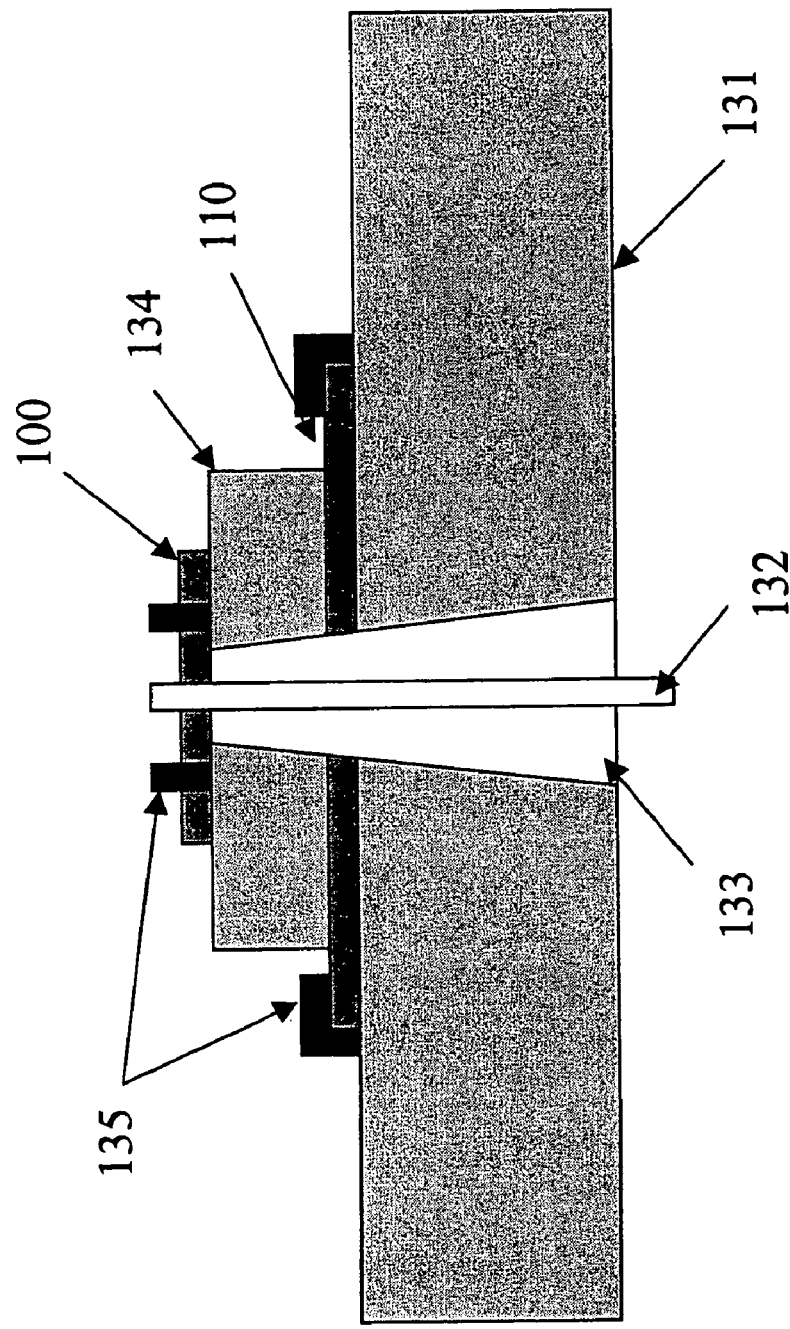
FIG. 13 is a side view of an integrated stepping and clamping mechanism for the X-Y precision translation stages of a micro-positioner of the present invention.

FIGS. 10 to 13 illustrate the micro-positioner of the present invention also implemented using MEMS technology. This implementation illustrated in FIGS. 10 to 13 uses differential expansion thermal actuators that are conventionally known in the art to perform the precision translation, through the scanning mechanism, and the precision clamping, through the clamping mechanism. Specifically, FIG. 10 shows a layout of the MEMS-based clamping X-translation stage. FIG. 11 shows a layout for a MEMS-based clamping Y-translation stage. FIG. 12 shows the X-translation stage mounted to the Y-translation stage to form the assembly for a X-Y translation stage. FIG. 13 shows the cross section of the X-Y stage assembly.

Micro-positioner 100 is shown in FIG. 10. As seen in FIG. 10, by controllably applying electrical signals through electrical connections to the bond pads 101, the direction and magnitude of scan by scanning mechanism 102 can be controlled in steps for gross positioning or in sub-step distances for fine positioning. This is accomplished by moving the scanner bar 103 to engage the gears with the gears on the scanning mechanism, deflecting the scanner bar 103 in the direction of desired scan, then disengaging the scanner bar 103. Also by controlling the electrical signal applied to the clamp mechanism 104, the clamp can be released for X stage motion and reengaged to hold the X scanning mechanism in a fixed position. The clamp mechanism 104 is used to hold the translation stage in place whenever it is not being moved by the scanning mechanism 102. The retainers 105 are sleeves that are over-the-edge clamps that restrain the motion of the translating component in one direction while allowing it to move freely in the other. The retainers 105 are not physically attached to the translation stages or the clamp mechanisms, but there is a small space between the retainers and the translation stage. Thermal actuators 106 perform translation through scanning mechanism 102 and precision clamping through clamp mechanism 104. Voltage is varied on the expansion actuators to set the step size. Motions less than a gear step can be made. While gears are shown on the scanning mechanism 102 in FIG. 10 as the means of moving and then locking the scanner bar 103, they may be removed for finer resolution.

FIG. 11 illustrates a micro-positioner 110 of the present invention that is adapted as a Y translation stage. As seen therein, movable mount aperture 112 of movable mount 111 is moved in the Y direction by scanning mechanism 113 through the expansion and contraction of the geared scanner bar 114, opening and closing of clamp mechanism 115 and retainers 116. Thermal actuators described earlier in the discussion of FIG. 8(b) move the scanner bar. While gears are shown in FIG. 11 as the means of moving and then locking the movable mount 111, they may be removed and replaced by friction contacts for finer resolution.

FIG. 12 is a top view of the integrated clamping mechanism 120 for the X-Y precision translation stages of the micro-positioner of the present invention. As seen in FIG. 12, the X-translation stage 100 and the Y-translation stage 110 are fabricated separately and the X-translation stage is physically attached to the Y-translation stage using standard techniques such as epoxy bonding, atomic bonding, solder reflow, eutectic bonding, or others. Standard silicon-based MEMS fabrication techniques may be used for the fabrication among other methods. For example, standard silicon-on-silicon and/or multi-level fabrication may be used to create the multilevel structure. The fiber relief cavity can be formed using deep reactive ion etching, among other techniques. Other methods of micro-positioner fabrication such as micro machining and LIGA fabricated parts would also provide a multi-dimensional device that when properly electrically activated will step the fiber to the desired position.

FIG. 13 is a side view of an integrated clamping mechanism 120 for the X-Y precision translation stages of the micro-positioner of the present invention. As seen therein, X stage 100 is mounted or formed on x-stage substrate 134, which is mounted on Y stage 110. The terminated end of a media, such as optical fiber 132, is threaded through fiber relief cavity 133 of Y stage substrate 131. Retainers 135 hold the various assemblies and subassemblies of micro-positioner 120 in position. The stages may be retained by other means, such as springs.

Figure 14:
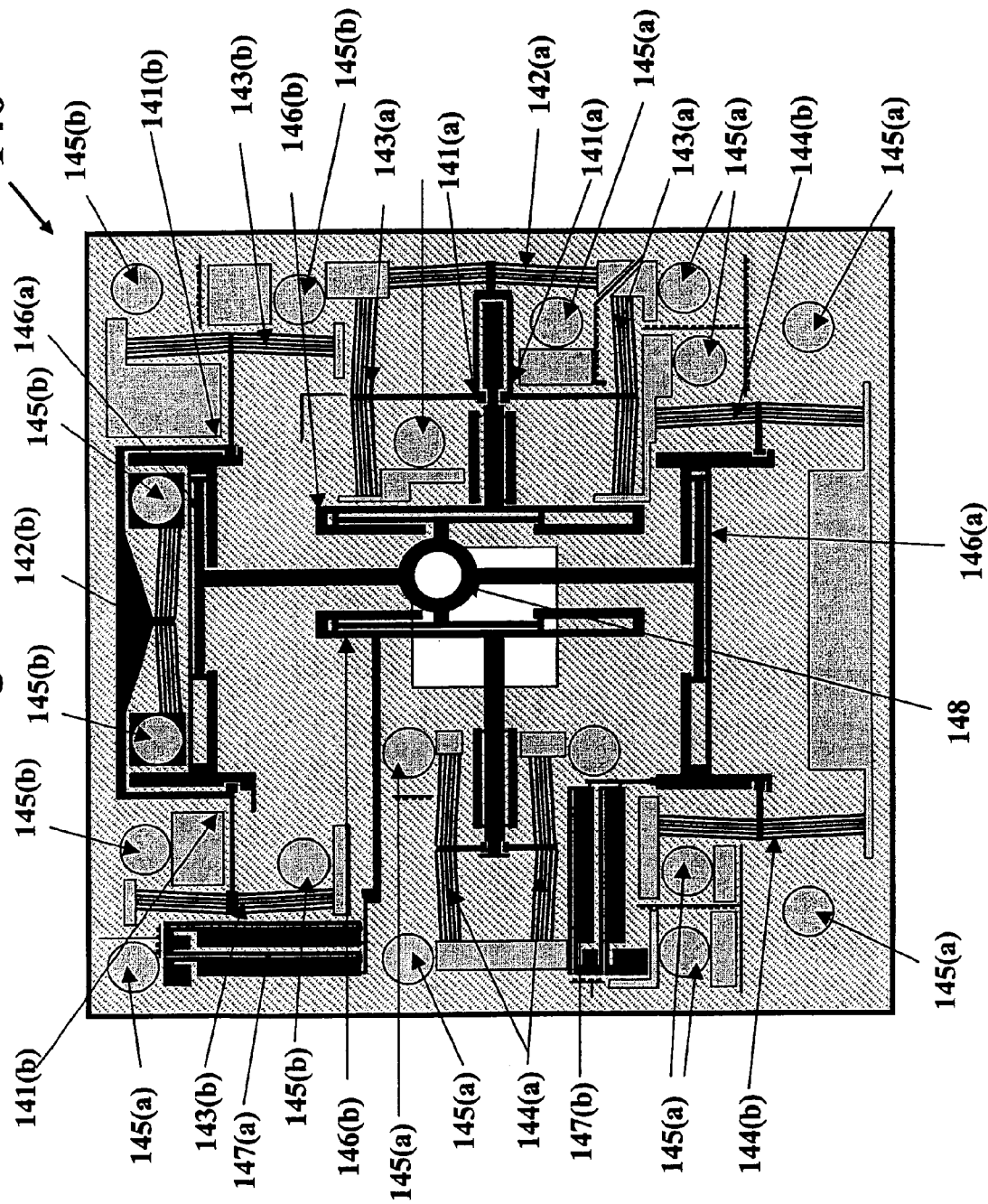
FIG. 14 is a top view of a second embodiment of a micro-positioner of the present invention, specifically, a MEMS based mechanism that uses step and clamp motion and slide retainers.

FIG. 14 is a top view of a second embodiment of the micro-positioner 140 of the present invention. As seen therein, micro-positioner 140 is comprised of the following subassemblies, components and elements: pinion actuators 141(a) and 141(b), pinion drives 142(a) and 142(b), pinion release 143(a) and 143(b), axis hold actuator 144(a) and 144(b), x-axis and y-axis interconnection bond pads 145(a)

and 145(*b*), x-axis slides and y-axis slides 146(*a*) and 146(*b*), axis setup actuators 147(*a*) and 147(*b*), and a movable aperture 148.

The apparatus of FIG. 14 provides for both X and Y motion without using retention springs as seen in the first embodiment of the micro-positioner. The moving aperture 148 slides and is guided by x-axis slides and y-axis slides 146(*a*) and 146(*b*). The pinions 141(*a*) and 141(*b*), provide motion as follows: at rest all pinion actuators, 142(*a*), 142(*b*), 143(*a*), 143(*b*), 144(*a*) and 144(*b*) are in contact with and are clamping movable aperture 148 such that the movable aperture is locked into position. When movement is desired, for example, in the X-direction, a voltage is applied to holding actuators 144(*a*) which expand and release the aperture 148. An additional voltage is applied to pinion drive actuators 142(*a*) which expand and push the aperture to the left. After the movement, voltage is removed from holding actuators 144(*a*) and they contract clamping the aperture. Voltage is then applied to pinion release actuator 143(*a*), which expands and releases the movable aperture, whereupon voltage can be removed from the pinion drive 142(*a*), and the pinion 141(*a*) moves back to its rest position. Voltage is then removed from pinion release 143(*a*), and the pinion contracts back to clamp the movable aperture. One step is completed. Additional application of the above voltage sequence causes the movable aperture to continue stepping to the left. Right movement is similar except the sequence of voltage application is reversed. In operation, the pin release 143(*a*) is actuated moving it from movable aperture 148, the pinion drive 142(*a*) is actuated moving it to the left, voltage is removed for the pinion release 143(*a*) and the pinion clamps movable aperture 148, voltage is applied to the pinion hold 144(*a*) releasing movable aperture 148, voltage is removed from the pinion drive and movable aperture 148 is pulled to the right, voltage is removed from the pinion release 143(*a*) and movable aperture 148 is in its rest state. Additional application of this voltage sequence causes the movable aperture (148) to move in steps to the right. Movement in the y-direction is achieved by performing the operation and timing of this procedure on Y-axis actuators 142(*b*), 143(*b*), and 144(*b*), which moves movable aperture 148 downward or upward.

Prior to using micro-positioner 140, it may need to be set up. The setup is required for devices that are fabricated using chemical etching procedures. Machining by etching creates gaps between features. As in the case for actuators 143(*a*), 143(*b*), 144(*a*), and 144(*b*), these gaps prevent firm clamping in the rest case with no voltages applied. The expansion mechanism 147(*a*) and 147(*b*) are provided to achieve setup. Expansion mechanism 147(*a*) and 147(*b*) consist of four arms, two wide for low electrical resistance and two narrow for much greater electrical resistance, all electrically connected such that when voltage is applied at the corresponding bond pads, current flows through all four arms. Appling voltage to expansion mechanisms 147(*a*) or 147(*b*), results in the narrow arm heating and expanding more than the wide arm and the expansion mechanism 147(*a*) or 147(*b*) bow. When the expansion mechanism 147(*a*) and 147(*b*) bow, they physically contract and move slides 146(*a*) and 146(*b*). Slides 146(*a*) and 146(*b*) are then moved to place actuators 144(*a*), 144(*b*), 143(*a*), and 143(*b*) into firm contact with movable aperture 148. Removing the voltage from 147(*a*) and or 147(*b*) results in the assemblies contracting and moving back to their rest position, but since the assemblies are not physically connected to the slides 146(*a*) and 146(*b*), the actuators 144(*a*), 144(*b*), 143(*a*), and 143(*b*) remain in firm contact.

The micro-positioner 140 can be manufactured as a silicon chip and can be implemented in one or two dimensions. A sequence of voltage or current pulse applied to the bond pads of the mechanism drives stepping motion in the desired direction.

Figure 15:
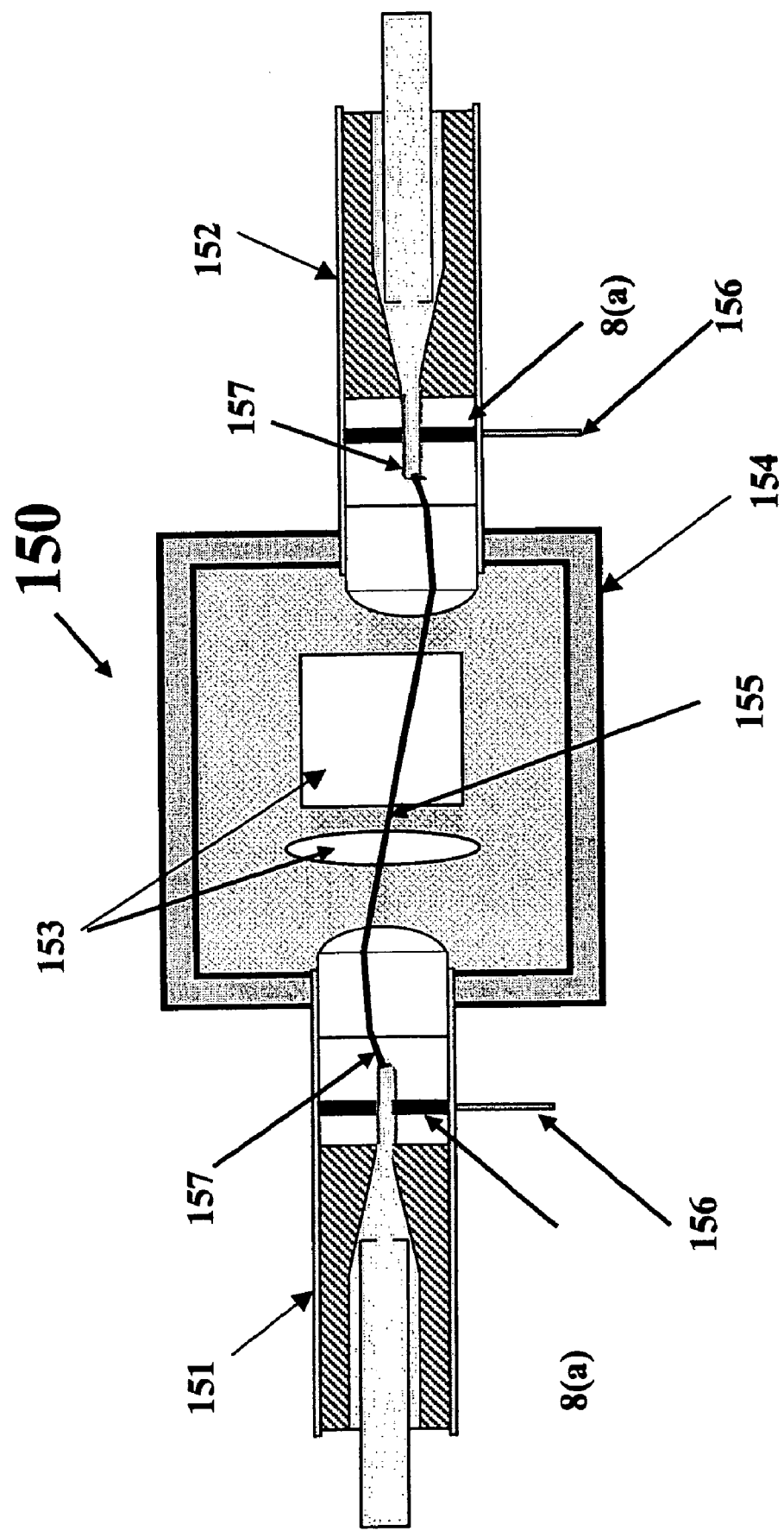
FIG. 15 illustrates the use of a pair of micro-positioners of the present invention in self-contained housings used to align optical fibers.

FIG. 15 illustrates one use of aligner 151 and aligner 152 of the present invention to achieve alignment of light paths through optical components 153. Optical components 153 are housed in case 154. An in situ dynamic aligner application and embodiment of the present invention utilizing the micro-positioner 80 of FIG. 8(*a*), is illustrated wherein aligner 151 is inserted into case 154 at the optical input and aligner 152 is inserted into case 154 at the output. Applying voltages at the leads 156 of aligners 151 and 152 adjust the terminated ends of optical fibers 157 and thus adjust the optical path 155 of a light beam to a desired position.

Figure 16:
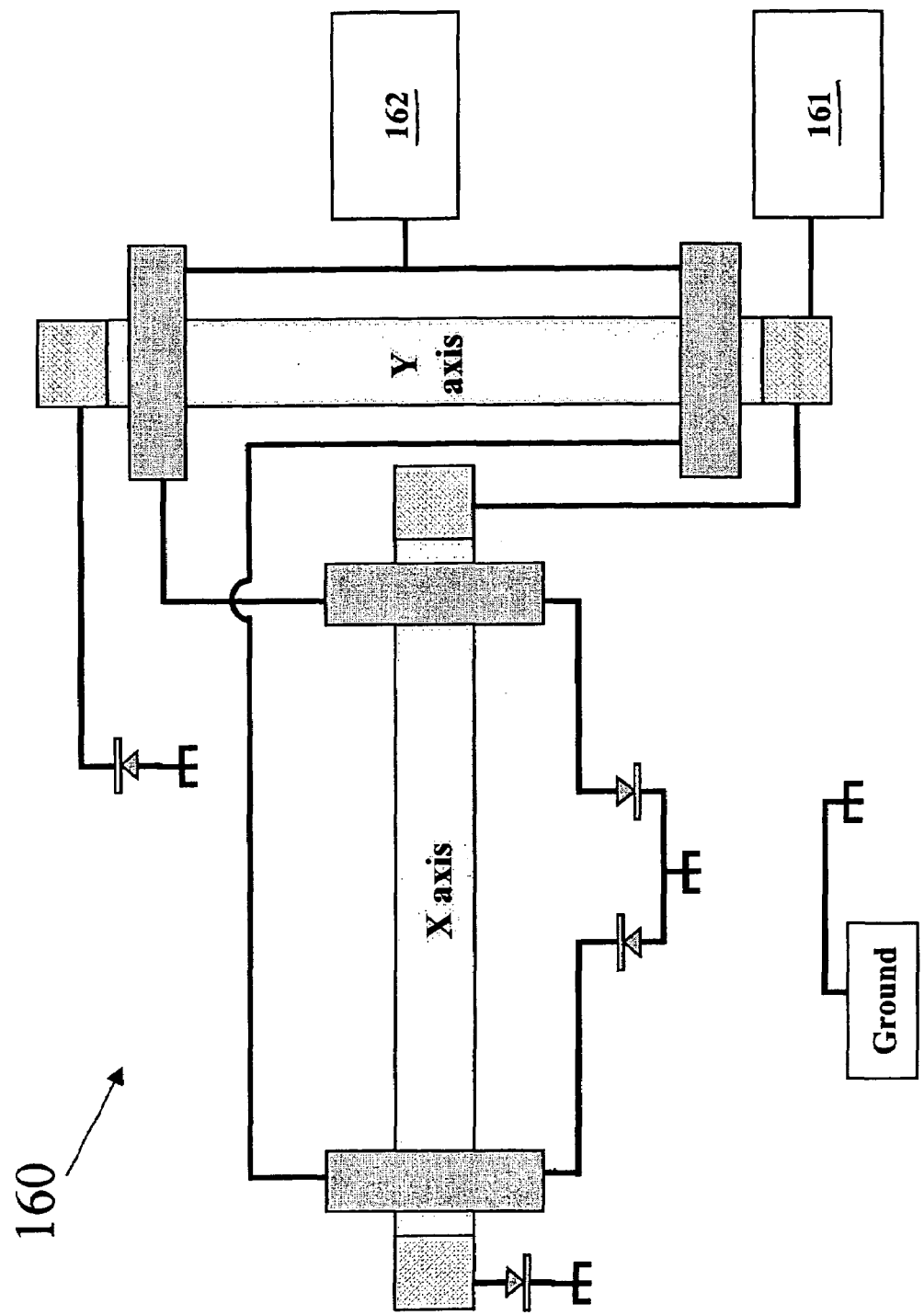
FIG. 16 is a schematic diagram that illustrates the electrical operation of a two dimensional micro-positioner expansion bar.
Figure 17:
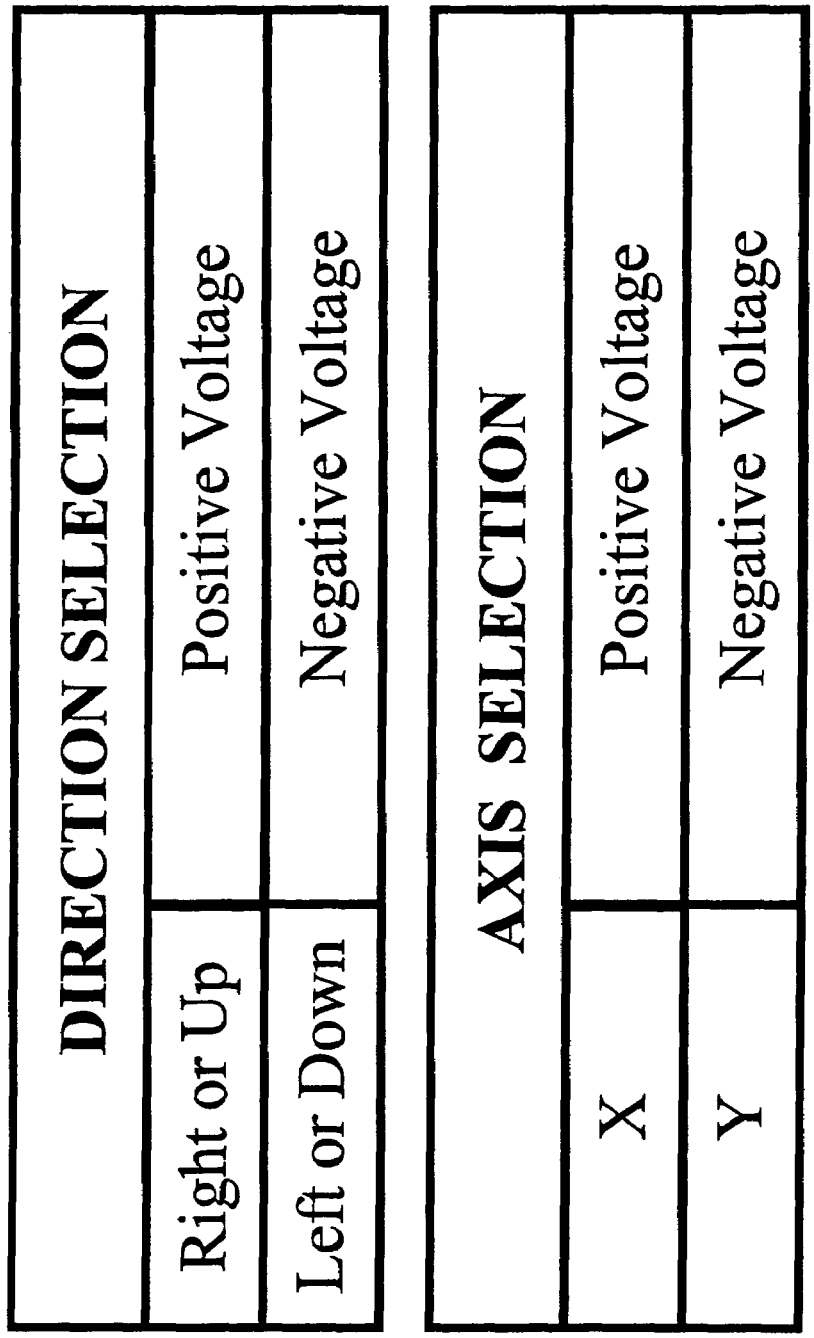
FIG. 17 is a logic diagram of the electrical schematic of FIG. 15.

FIG. 16 is a schematic diagram that illustrates the electrical operation of a two-dimensional micro-positioner 160. The clamp/expansion bar expansion and contraction operation of the X-Y micro-positioner 160 is similar to that of the one-dimensional micro-positioner 50 of FIG. 5. As seen in FIG. 16, when a positive voltage is applied to axis terminal 161, X movement is enabled and when a negative voltage is applied to axis terminal 162, Y movement is enabled. When a positive voltage is applied to direction terminal 162, the X-axis direction is to the right or the Y-axis direction is up and when a negative voltage is applied to direction terminal 162 the X-axis direction is to the left or the Y-axis direction is down. FIG. 17 is a logic diagram of the electrical schematic of FIG. 16.

Figure 18:
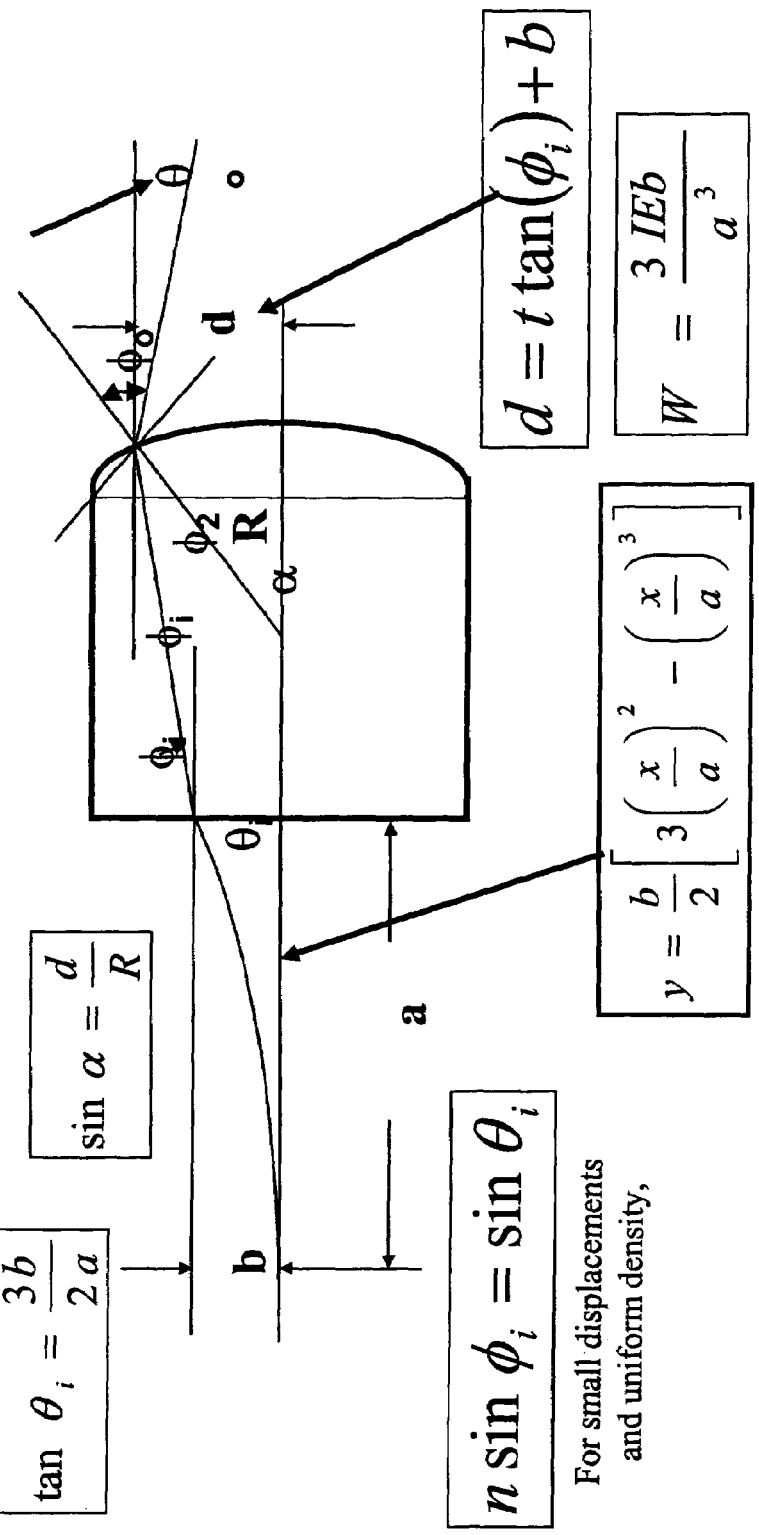

FIGS. 18 and 19 set forth optical performance and maximum fiber force required for an exemplary embodiment of the present invention.

FIG. 18 lists the governing equations relating change in beam pointing angle and lateral displacement as the media, such as an optical fiber, is displaced by a micro-positioner, where b is defined as the fiber displacement, d the beam displacement and $\phi_o$ is the beam-pointing angle. The equations apply for conventional lenses although gradient index and spherical lenses among others may be used.

The formulas of FIG. 19 represent a media, such as an optical fiber, treated as a cantilever beam. One end of an optical fiber is attached and held rigid. The other, terminated end is fitted with the micro-positioner of the present invention that positions and adjusts the optical fiber. That causes a slight arc into the optical fiber, thus a certain amount of force is required to hold it in position. In box 1 of FIG. 18, W represents the formula for the force required to hold the optical fiber in position, I is the moment of inertia, a is the length of the optical fiber from the point it is in contact with the micro-positioner to the point where it is held or the length to the cantilever beam. Box 2 of FIG. 18 is the formula for I, the moment of inertia, where r is the radius of the optical fiber. The formulas of box 1 and 2 lead to the equation of box 3, which is the equation that describes the forces necessary to hold the optical fiber in position using the representative parameters of box 4. As seen in FIG. 18, the micro-positioner must exert a force of approximately 2.0 milli-newton to hold an optical fiber in place.

Figure 20:
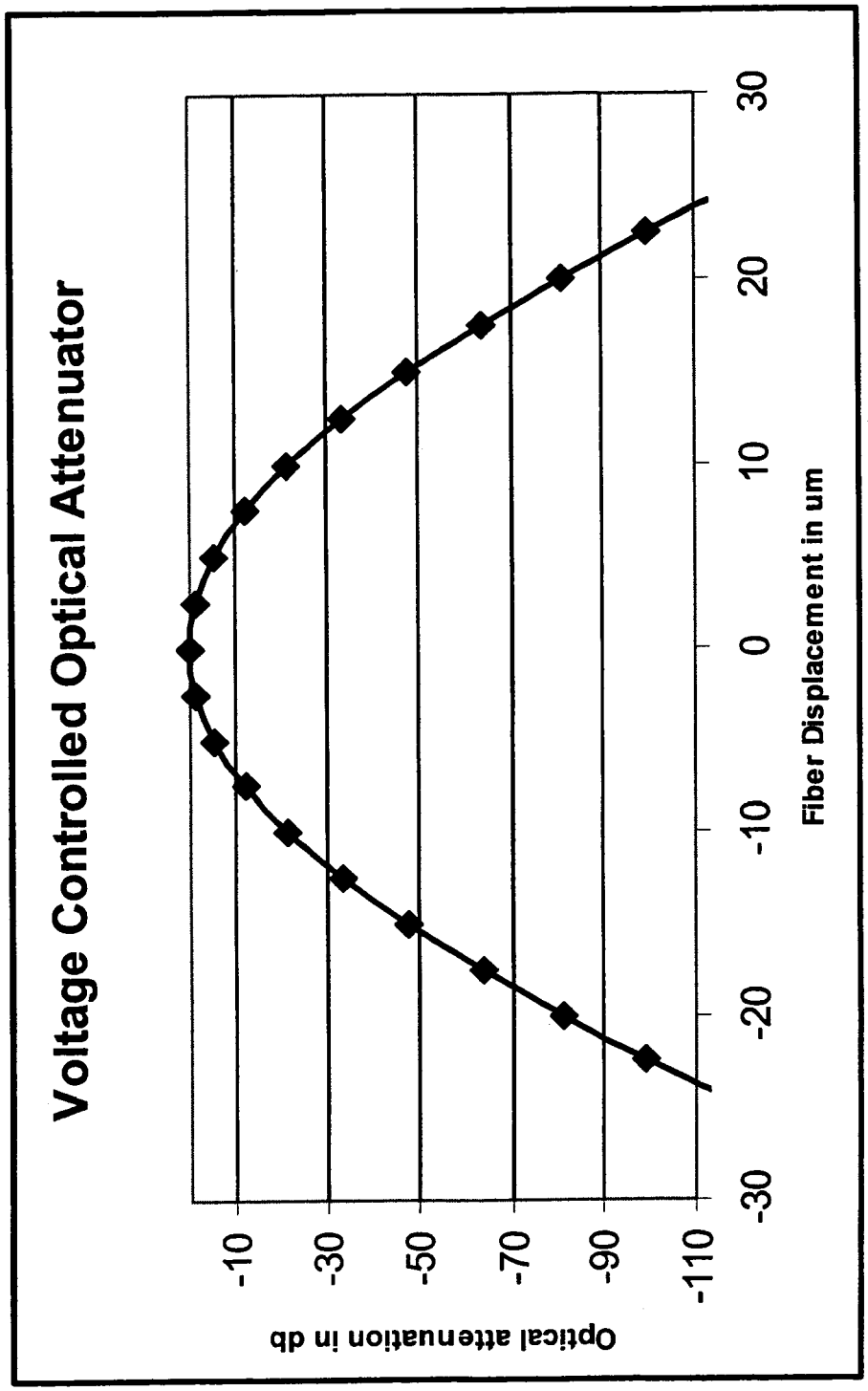
FIG. 20 is a graph illustrating range of control, performance as a variable optical attenuator ("VOA") as a function of fiber displacement.

FIG. 20 is a graph illustrating performance of a VOA, with range of control as a function of fiber displacement. As seen therein, when an optical fiber is moved to one side, insertion loss takes place, and thus the device is acting as an attenuator. In operation, typically there are two such devices, thus, there would be twice the attenuation performance.

Figure 21:
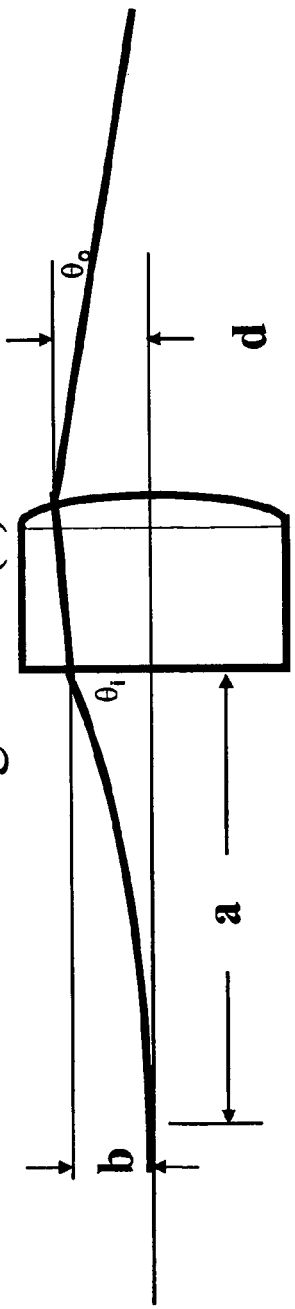
FIG. 21(a) is a side view of a lens illustrating a light ray angles from an optical fiber.
FIG. 21(b) is a graph illustrating optical control and collimator performance as a function of fiber displacement.
Figure 21:
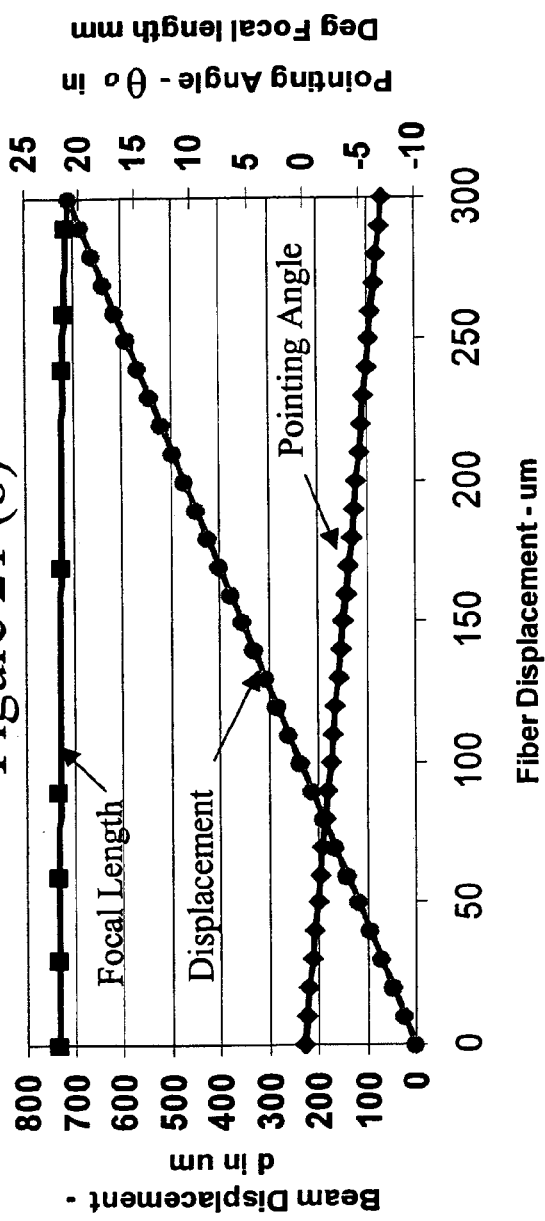

FIG. 21(*a*) is a side view of a lens illustrating light ray output pointing angles and output beam displacement as the fiber is displaced radially. FIG. 21(b) is a graph illustrating optical control and collimator performance as a function of fiber displacement. As seen therein, FIG. 21(b) illustrates several optical results of moving an optical fiber using the present invention. These include a change in the pointing angle, the working distance between the optical fiber and lens, and the offset of the beam at the output of the lens. In FIG. 21(b), the working distance is shown as a line with boxes. Advantageously, working distance changes very little as the optical fiber is displaced. The pointing angle refers to when the light leaves the lens. It is shown as a line with diamonds on FIG. 21(b). It changes over a range as much as five degrees of point and angle changes. Beam displacement, shown as a line with circles, advantageously tracks substantially linearly as it changes up to about 700 microns.

Figure 22:
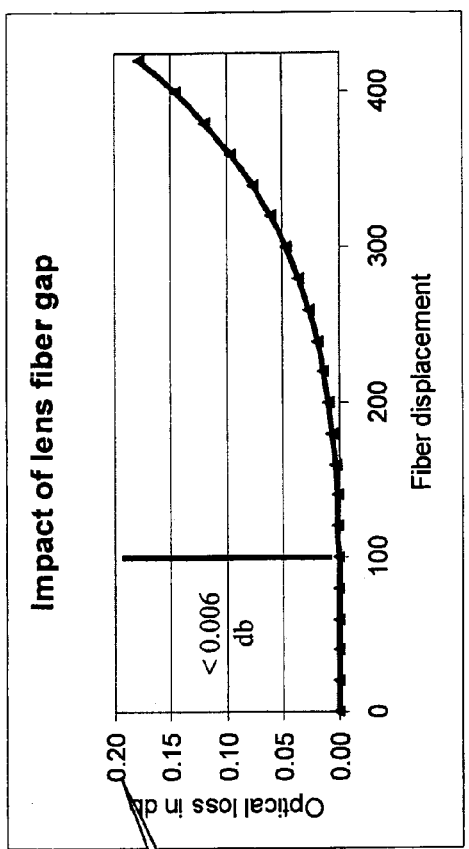
FIGS. 22(a) and 22(b) are graphs illustrating constraints on performance of fiber optics.
Figure 22:
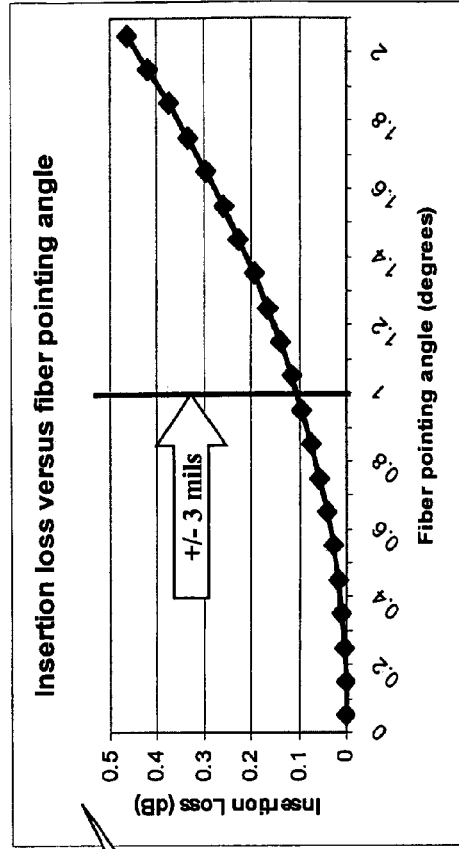

FIGS. 22(a) and 22(b) are graphs illustrating typical mechanical constraints on design and manufacturing of the in situ fiber aligner embodiment and application of the present invention. These constraints apply to typical applications but they may be violated as an application may require.

Figure 23:
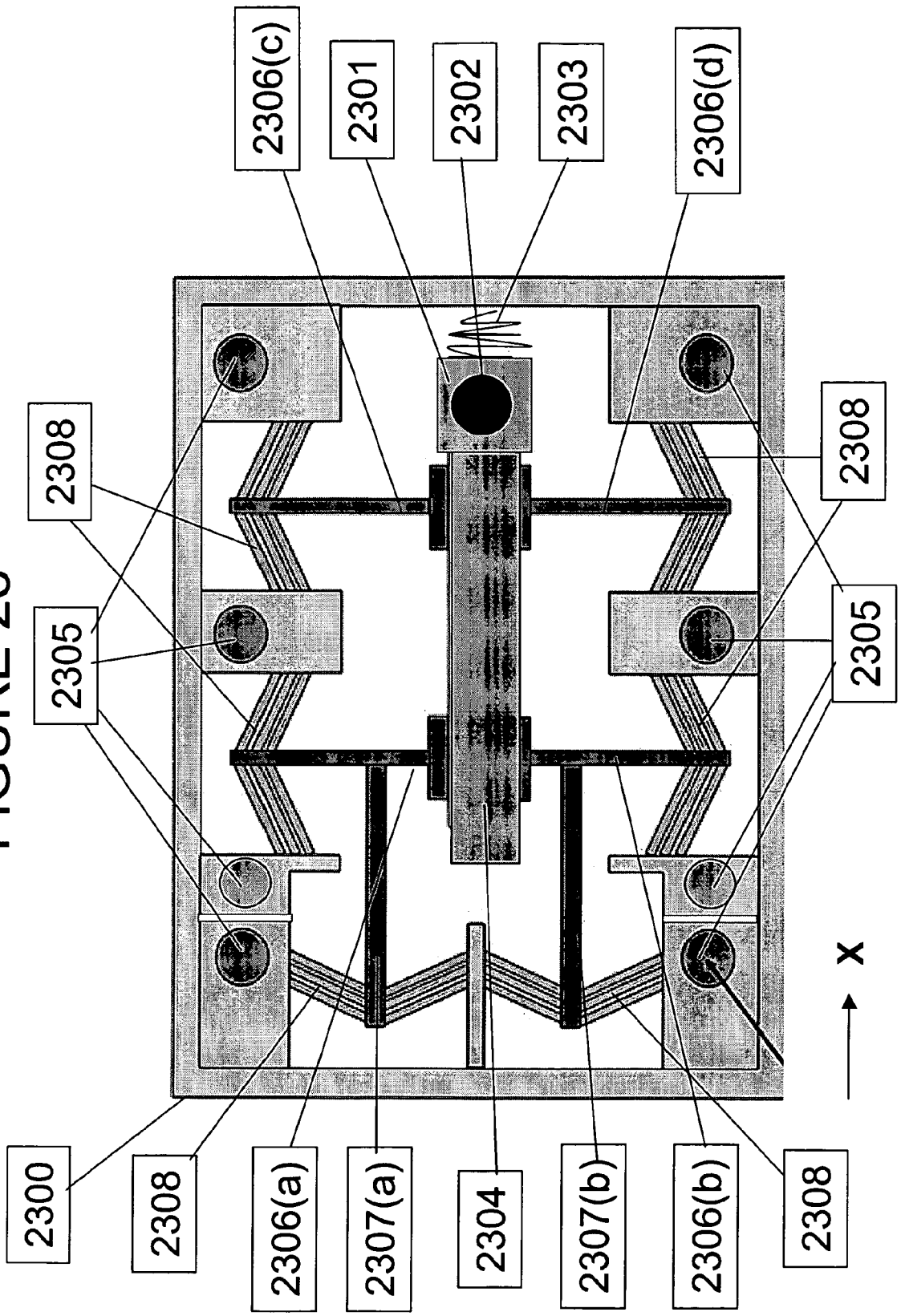
FIG. 23 is a top view of a further embodiment of the micro-positioner of the present invention shown in one dimension only.

FIG. 23 is a top view of a further embodiment of the micro-positioner 2300 of the present invention shown in one dimension only. As seen therein, micro-positioner 2300 is comprised of the following subassemblies, components and elements: shuttle or mounting assembly 2301, and shuttle aperature 2302, shuttle spring 2303, scanning bar 2304, bond pads 2305, clamps 2306(a), 2306(b), 2306(c) and 2306(d), push/pull arms 2307(a) and 2307(b), and actuators 2308. The foregoing components and elements can be comprised of semiconductor material. In the embodiment seen in FIG. 23, shuttle 2301 of micro-positioner 2300 is adapted to move in one direction. As seen therein, shuttle 2301 is attached to micropositioner 2300 with shuttle spring 2303 and shuttle 2301 is adjusted or aligned by scanning bar 2304. Shuttle spring 2303 is used for retention of shuttle 2301 in this embodiment. Actuators 2308 provide the displacement to (a) release the clamps or (b) move the scanning bar by thermal expansion due to an applied electrical signal. The actuators acting in controlled sequence with the clamps cause the scanning bar to move in the positive or negative direction (along the x-axis). The step drive subassembly consists of two thermal actuated clamps 2306(a) and 2306(b) and two thermal actuated push/pull arms, 2307(a) and 2307(b), mechanically coupled to clamps 2306(a) and 2306(b). The step drive and clamp assembly consists of the step drive assembly just described plus clamps 2306(c) and 2306(d). Associated with the clamp and stepping subassembly are corresponding bond pads 2305 to which electrical connections can be made to the clamps and push/pull arms. External analog or logic circuitry (not shown) are coupled to micro-positioner 2300 via these bond pads 2305.

The micro-positioner 2300 can be manufactured as a silicon chip and can be implemented in one or two-dimensional arrays. Alternating the clamping and unclamping of directional clamps relative to the push/pull actuator pushes or pulls a scanning bar in a stepping motion to change the position of a shuttle. In this implementation, shuttle spring 2303 is used to provide in plane stability to shuttle 2301 and is designed to provide minimum opposing push force to push/pull arms 2307(a) and 2307(b). In another embodiment of the present invention, the micro-positioner 2300 is comprised of all the foregoing components, subassemblies and elements except shuttle spring 2303 is eliminated. In this embodiment, scanning bar 2304 is mechanically coupled to shuttle 2301. In an exemplary embodiment, the microposi-tioner can have dimensions of between 1 to 5 mm (1), 1 to 5 mm (w) and 0.1 to 1 mm (h).

Figure 24A:
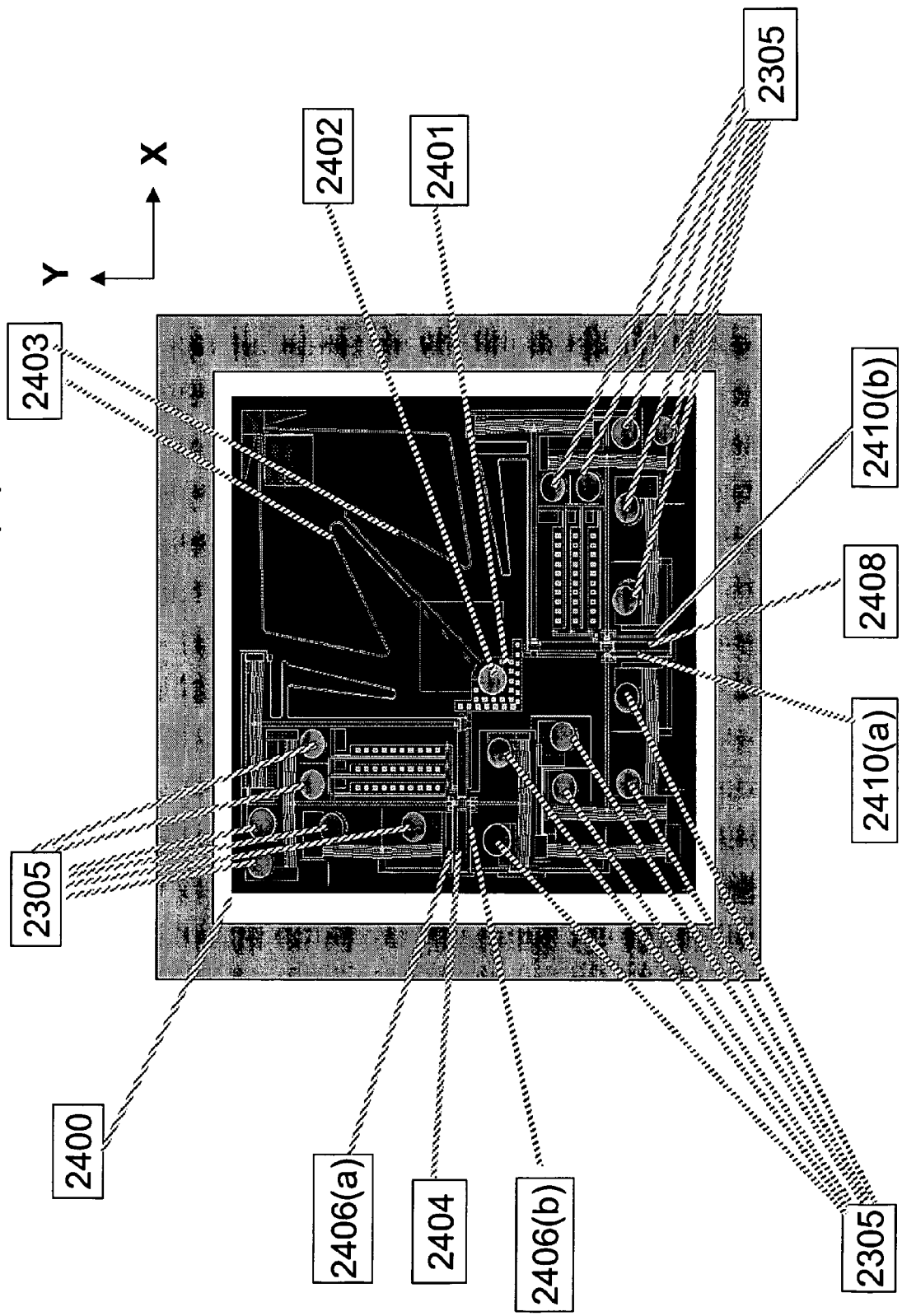
FIG. 24 comprises a top view of an embodiment of the micro-positioner of the present invention designed for x-y motion, said FIG. 24 being provided in subparts (a) and (b) so as to more clearly delineate the reference numerals.
Figure 24B:
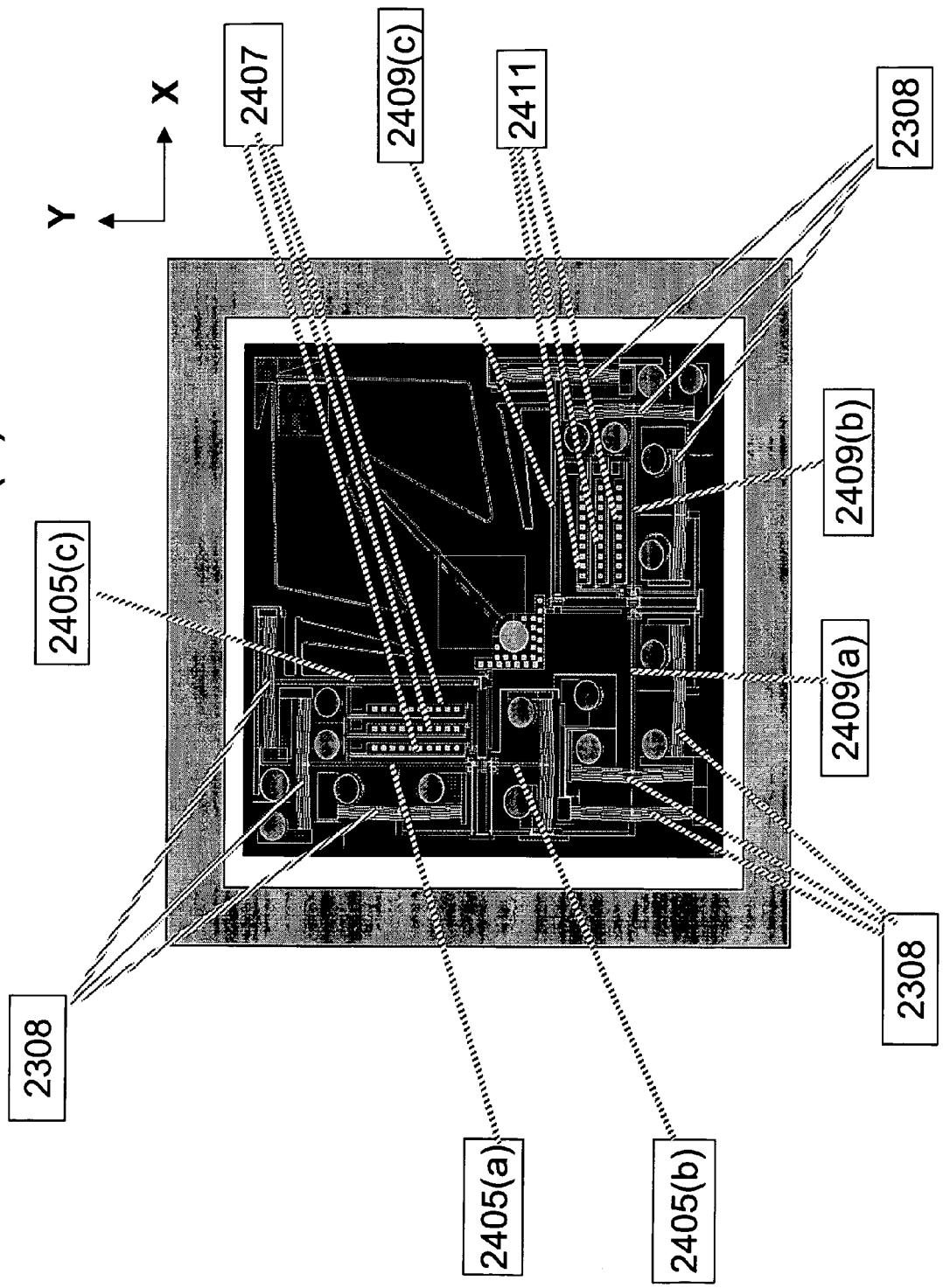

FIG. 24 comprises a top view of another embodiment of the micro-positioner 2400 of the present invention designed for x-y motion, said FIG. 24 being provided in subparts (a) and (b) so as to more clearly delineate the reference numerals. As seen therein, micro-positioner 2400 is comprised of the following subassemblies, components and elements: thermal actuators 2308, shuttle or mounting assembly 2401, shuttle aperture 2402, springs 2403, bond pads 2305, x-axis scanning bar 2404, x-axis clamps 2405(a), 2405(b) and 2405(c), x-axis push/pull arms 2406(a) and 2406(b), x-axis thermal actuators for setup 2407, y-axis scanning bar 2408, y-axis clamps 2409(a), 2409(b) and 2409(c), y-axis push/pull arms 2410(a) and 2410(b) and y-axis thermal actuators for setup 2411. The foregoing components and elements may be comprised of semiconductor material. Shuttle 2401 of micro-positioner 2400 is adapted to move in the X direction and/or the Y direction. Shuttle 2401 is attached to micropositioner 2400 with two shuttle springs 2403 and shuttle 2401 is adjusted or aligned in the X direction by x-axis scanning bar 2404 and in the Y direction by y-axis scanning bar 2408. Shuttle springs 2403 are used for retention and restoring force to shuttle 2401 in this embodiment. The X direction step drive subassembly consists of two thermal actuated x-axis clamps 2405(a) and 2405(b) and two thermal actuated x-axis push/pull arms, 2406(a) and 2406(b), mechanically coupled to x-axis clamps 2405(a) and 2405(b). The X direction step drive and clamp assembly consists of the X direction step drive assembly just described plus x-axis clamp 2405(c). The Y direction step drive subassembly consists of two thermal actuated y-axis clamps 2409(a) and 2409(b) and two thermal actuated y-axis push/pull arms, 2410(a) and 2410(b), mechanically coupled to y-axis clamps 2409(a) and 2409(b). The Y direction step drive and clamp assembly consists of the Y direction step drive assembly just described plus y-axis clamp 2409(c). In this embodiment, the x-axis thermal actuators 2407 and y-axis thermal actuators 2411 are used to setup the the clamping and stepping capability. The x-axis clamp and stepping subassembly, the x-axis thermal actuators, the y-axis clamp and stepping subassembly and y-axis thermal actuators have corresponding bond pads to which electrical connections are made to the thermal actuators, clamp actuators and push/pull arm actuators. External analog or logic circuitry (not shown) are coupled to micro-positioner 2400 via these bond pads. Alternating the clamping and unclamping of directional clamps pushes or pulls a scanning bar in a stepping motion to change the position of a shuttle depending on the stepping and clamping sequence. In an exemplary embodiment, the micropositioner can be dimensioned of 1 to 5 mm (1), 1 to 5 mm (w) and 0.1 to 1 mm (h).

Figure 25A:
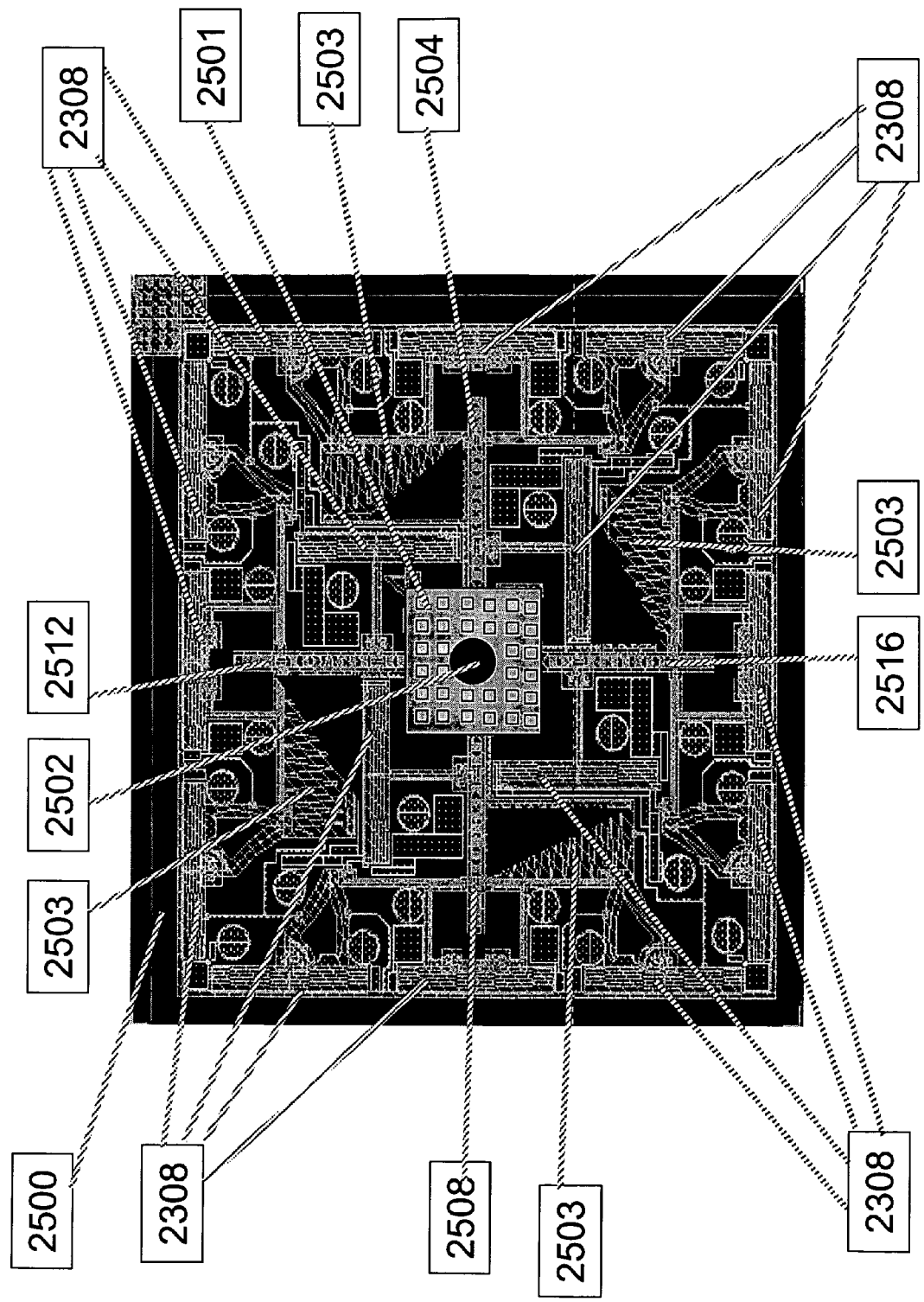
FIG. 25 comprises a top view of another embodiment of the micro-positioner of the present invention, said FIG. 25 being provided in subparts (a), (b) and (c) so as to more clearly delineate the reference numerals.
Figure 25B:
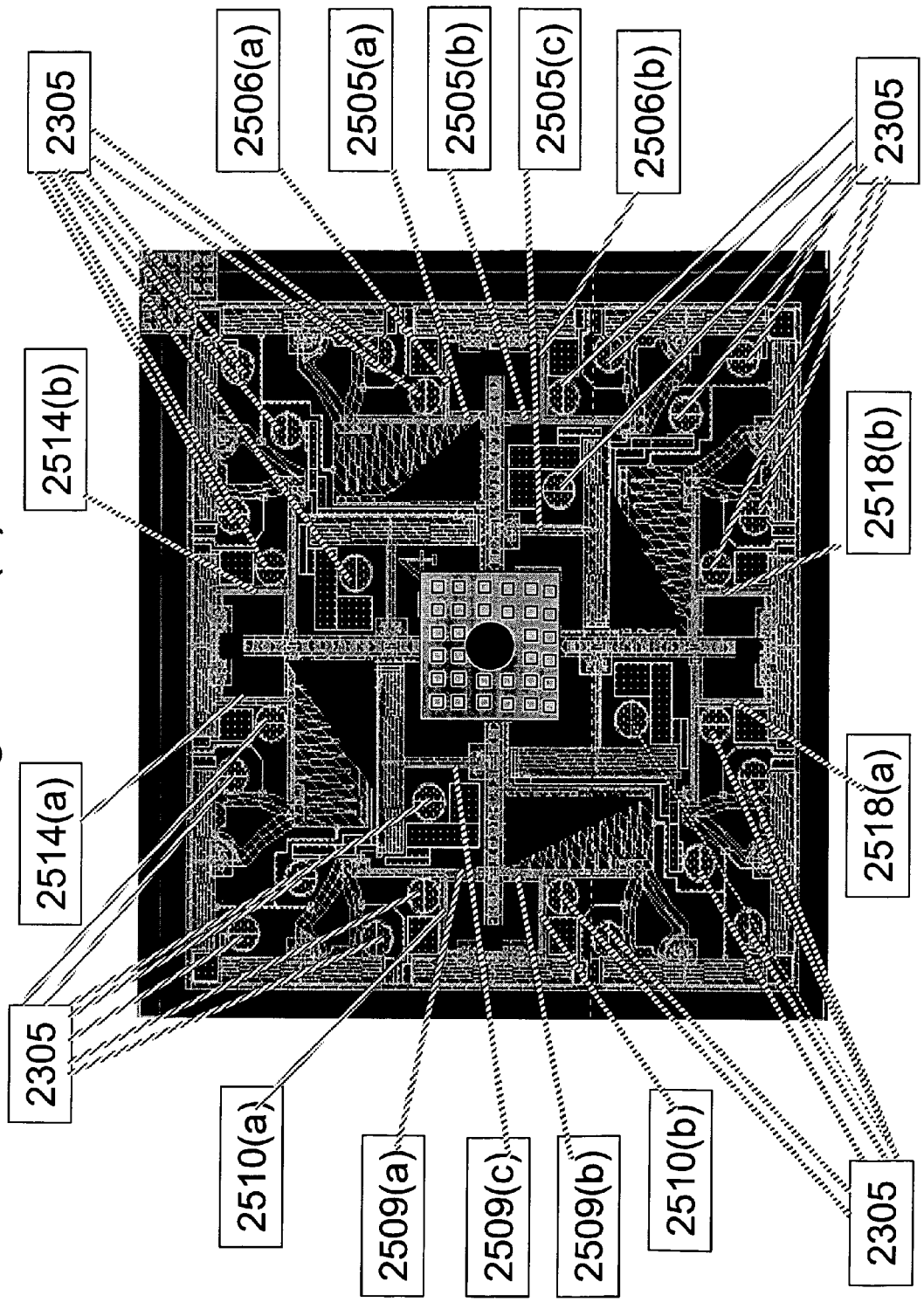
Figure 25C:
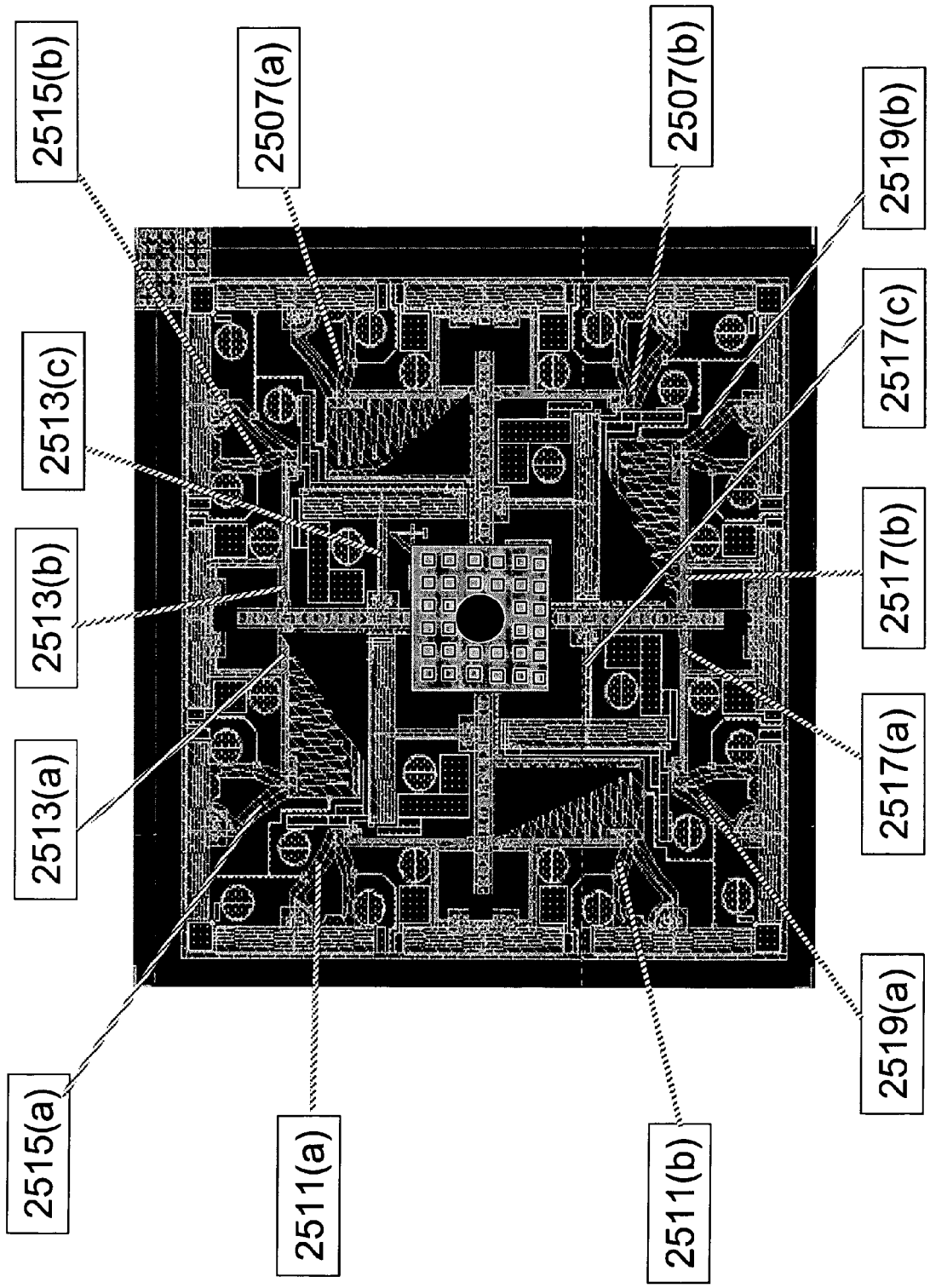

FIG. 25 comprises a top view of another embodiment of the micro-positioner 2500 of the present invention, said FIG. 25 being provided in subparts (a), (b) and (c) so as to more clearly delineate the reference numerals. As seen therein, micro-positioner 2500 is comprised of the following subassemblies, components and elements: thermal acutators 2308, shuttle or mounting assembly 2501, shuttle aperture 2502, retention springs 2503, bond pads 2305, x-axis right side scanning bar 2504, x-axis left side scanning bar 2508, x-axis right side clamps 2505(a), 2505(b) and 2505(c), x-axis left side clamps 2509(a), 2509(b) and 2509(c), x-axis right side push/pull arms 2506(a) and 2506(b), x-axis left side push/pull arms 2510(a) and 2510(b), x-axis right side lever arms 2507(a) and 2507(b), x-axis left side lever arms 2511(a) and 2511(b), y-axis top side scanning bar 2512, y-axis bottom side scanning bar 2516, y-axis top side clamps 2513(a), 2513(b) and 2513(c), y-axis bottom side clamps 2517(a), 2517(b) and 2517(c), y-axis top side push/pull arms 2514(a) and 2514(b), y-axis bottom side push/pull arms 2518(a) and 2518(b), y-axis top side lever arms 2515(a) and 2515(b), y-axis bottom side lever arms 2519(a) and 2519(b). In one embodiment of the present invention, the foregoing components and elements are comprised of semiconductor material. Shuttle 2501 of micro-positioner 2500 is adapted to move in the X direction and/or the Y direction. Shuttle 2501 is held in plane and adjusted or aligned in the X direction by x-axis scanning bars 2504 and 2508 and in the Y direction by y-axis scanning bars 2512 and 2516. Shuttle spring 2503 is used for retention in this embodiment. The X direction step drive subassembly consists of four thermal actuated x-axis clamps 2505(a), 2505(b), 2509(a) and 2509(b), four x-axis push/pull arms, 2506(a), 2506(b), 2510(a) and 2510(b) mechanically coupled to x-axis clamps 2505(a) and 2505(b) and 2509(a) and 2509(b), and, four thermal actuated lever arms 2507(a), 2507(b), 2511(a) and 2511(b) mechanically coupled to x-axis push/pull arms 2506(a), 2506(b), 2510(a) and 2510(b). The X direction step drive and clamp assembly consists of the X direction step drive assembly just described plus x-axis clamps 2505(c) and 2509(c). The Y direction step drive subassembly consists of four thermal actuated y-axis clamps 2513(a), 2513(b), 2517(a) and 2517(b), four y-axis push/pull arms, 2514(a), 2514(b), 2518(a) and 2518(b) mechanically coupled to y-axis clamps 2513(a) and 2513(b) and 2517(a) and 2517(b), and, four thermal actuated lever arms 2515(a), 2515(b), 2519(a) and 2519(b) mechanically coupled to x-axis push/pull arms 2514(a), 2514(b), 2518(a) and 2518(b). The Y direction step drive and clamp assembly consists of the Y direction step drive assembly just described plus y-axis clamps 2513(c) and 2517(c). Associated with the x-axis clamp and stepping subassembly and the y-axis clamp and stepping subassembly are corresponding bond pads to which electrical connections can be made to the clamp and push/pull arm actuators. External analog or logic circuitry (not shown) are coupled to micro-positioner 2500 via the bond pads 2305. Alternating the clamping and unclamping of directional clamps pushes or pulls a scanning bar in a stepping motion to change the position of a shuttle. In another embodiment of the present invention, the micro-positioner 2500 is comprised of all the foregoing components, subassemblies and elements except shuttle springs 2503 are reduced in number from four to one and attached to shuttle 2501 and to micro-positioner 2500. In an exemplary embodiment, the micropositioner so described can have dimensions of between 1 to 5 mm (1), 1 to 5 mm (w) and 0.1 to 1 mm (h).

Advantages of the present invention include (i) substantial cost reduction and improved performance; (ii) during application no human intervention and no specialized equipment are required. The small form factor of the present invention allows several devices per semiconductor wafer in the semiconductor embodiment of the present invention. The present invention is remotely configurable, can be utilized in active and passive network components and meets industry requirements for maintaining alignment during mechanical and thermal stresses.

A variety of components can be manipulated by the micropositioner arrangement. These include lenses, prisms, detectors, diodes, laser diodes, sensors, antenna elements, rf stubs, valves or nozzles. The optical embodiment of the present invention can be used in any device requiring an optical interface, such as variable optical attenuators ("VOAs"), demultiplexers, multiplexers, switches, optical amplifiers, filters, transmitters, receivers, modulators and for gain flattening or tilting.

The innovative teachings of the present invention are described with particular reference to the embodiments disclosed herein. However, it should be understood and appreciated by those skilled in the art that the several embodiments of the apparatus disclosed herein provide only examples of the many advantageous uses and innovative teachings herein. Various non-substantive alterations, modifications and substitutions can be made to the disclosed apparatus without departing in any way from the spirit and scope of the invention.

We claim:

1. A micro-positioner, comprising:
   a mounting assembly;
   a shuffle movably located within the mounting assembly;
   a shuffle spring with a first end and second end;
   the first end of the shuttle spring coupled to a wall of the mounting assembly and the second end of the shuttle spring coupled to a side of the shuttle;
   the shuttle spring adapted to provide a force between said wall of the mounting assembly and said side of the shuttle;
   a scanning bar coupled to the side of the shuttle opposite the side coupled to the shuttle spring;
   at least a first actuator set and a second actuator set;
   at least a first bond pad set and a second bond pad set adapted to providing electrical connections to the at least first actuator set and the second actuator set;
   at least a first clamp set coupled to the at least first actuator set;
   at least one push/pull arm with a first proximate end and a second proximate end, the first proximate end coupled to the at least second actuator set and the second end coupled to the at least first clamp set;
   the first actuator, when engaged, operable to cause the first clamp set to release or apply a force against the sides of the scanning bar; and
   the second actuator set, when engaged, operable to push or pull the first clamp set laterally.

2. The micro-positioner of claim 2, further comprising the shuttle having a shuttle aperture.

3. The micro-positioner of claim 1, wherein the first actuator set is adapted to retract the first clamp set when an electrical signal is applied across the first bond set.

4. The micro-positioner of claim 1, wherein the second actuator set is adapted to move the push/pull bar when an electrical signal is applied across the second bond set.

5. The micro-positioner of claim 1, further comprising:
   a second clamp set; and
   a third actuator set;
   the third actuator set, when engaged, operable to cause the second clamp set to release or apply a force against the sides of the scanning bar.

6. The micro-positioner of claim 5, further comprising the third actuator set adapted to retract the second clamp set when an electrical signal is applied across the first electrical bond set.

7. The micro-positioner of claim 1, wherein the components are made of semiconductor material.

8. The micro-positioner of claim 1, wherein the actuators are manufactured of material having a predicable thermal expansion co-efficient.

9. The micro-positioner of claim 1, further comprising a circuit adapted to apply electrical signals to the actuators in a controlled sequence.

10. The micro-positioner of claim 1, wherein the first set of clamps, the scanning bar and the push/pull arms are arranged as a step drive assembly.

11. The micro-positioner of claim 1, further comprising being manufactured as a silicon chip.

12. The micro-positioner of claim 1, further comprising being implemented in a multidimensional array.

13. A micro-positioner designed for x-y motion, comprising:
   a mounting assembly;
   at least a first set of thermal actuators;
   a shuttle adapted to move in the x direction and y direction; at least a first set of shuttle springs;
   said shuttle movably coupled to the mounting assembly by such at least first set of shuttle springs;
   an X direction step drive subassembly coupled to the shuttle; a Y direction step drive subassembly coupled to the shuttle;
   at least a first and second set of bond pads coupled to each of the X direction step drive subassembly and Y direction step drive subassembly, adapted to provide electrical signals to each of the X direction step drive subassembly and Y direction step drive subassembly; and
   the shuttle adapted to being adjusted or aligned in the X direction by the X direction step drive subassembly and Y direction step drive subassembly.

14. The micro-positioner of claim 13, wherein the shuttle has an aperture.

15. The micro-positioner designed for x-y motion of claim 13, wherein the shuttle springs are adapted to provide a retention and restoring force to the shuttle.

16. The micro-positioner designed for x-y motion of claim 13, wherein the X direction step drive subassembly further comprises:
   a first and second thermal actuated x-axis clamp;
   a first and second thermal actuated x-axis push/pull arm mechanically coupled to the first and second x-axis clamp; and
   an X direction step drive and clamp assembly comprising the X direction step drive subassembly and a third x-axis clamp.

17. The micro-positioner designed for x-y motion of claim 16, further comprising an x-axis push/pull arm actuator.

18. The micro-positioner designed for x-y motion of claim 16, wherein the Y direction step drive subassembly comprises:
   a first and second thermal actuated y-axis clamp;
   a first and second thermal actuated y-axis push/pull arm mechanically coupled to y-axis clamps; and
   a Y direction step drive and clamp assembly comprising the Y direction step drive subassembly and a third y-axis clamp.

19. The micro-positioner designed for x-y motion of claim 18, further comprising a y-axis push/pull arm actuator.

20. The micro-positioner designed for x-y motion of claim 19, further comprising x-axis thermal actuators and y-axis thermal actuators adapted to setup the clamping and stepping capability.

21. The micro-positioner designed for x-y motion of claim 20, further comprising a plurality of bond pads coupled to the x-axis clamp and stepping subassembly, the x-axis thermal actuators, the y-axis clamp and stepping subassembly and y-axis thermal actuators to which electrical connections.

22. The micro-positioner designed for x-y motion of claim 20, further comprising external analog or logic circuitry adapted to apply signals to the bond pads to control the clamping and unclamping of the directional clamps and the movement of the shuttle.

23. The micro-positioner designed for x-y motion of claim 13, further being comprised of semiconductor material.

24. A micro-positioner, comprising:
   a mounting assembly;
   a first set of thermal actuators;
   a shuttle adapted to move in an x-axis or y-axis direction;
   a set of retention springs used to retain the shuttle in the mounting assembly; a plurality of bond pads;
   an X direction step drive subassembly further comprising an x-axis right side scanning bar and an x-axis left side scanning bar adapted to hold the shuttle in plane, and align the shuttle in the X direction, a set of x-axis right side clamps, a set of x-axis left side clamps, a set of x-axis right side push/pull arms, a set of x-axis left side push/pull arms, a set of x-axis right side lever arms, and a set of x-axis left side lever arms; and
   a Y direction step drive subassembly further comprising a y-axis top side scanning bar and a y-axis bottom side scanning bar adapted to hold the shuttle in plane, and align the shuttle in the Y direction, a set of y-axis top side clamps, a set of y-axis bottom side clamps, a set of y-axis top side push/pull arms, a set of y-axis bottom side push/pull arms, a set of y-axis top side lever arms, a set of y-axis bottom side lever arms.

25. The micro-positioner of claim 24, further comprising a set of thermal actuators coupled to, and adapted to move the set of x-axis clamps, set of y-axis clamps, the set of x-axis push/pull arms, the set of y-axis push/pull arms and set of x-axis lever arms and y-axis lever arms.

26. The micro-positioner of claim 25, further comprising:
   an X direction step drive subassembly further comprising four x-axis push/pull arms being mechanically coupled to x-axis clamps and four thermal actuated lever arms mechanically coupled to x-axis push/pull arms;
   the X direction step drive subassembly and a second set of x-axis clamps further comprising an X direction step drive and clamp assembly;
   a Y direction step drive subassembly four thermal actuated y-axis clamps, four y-axis push/pull arms mechanically coupled to the y-axis clamps and four thermal actuated lever arms mechanically coupled to x-axis push/pull arms; and
   the Y direction step drive subassembly and a second set of y-axis clamps further comprising a Y direction step drive and clamp assembly.

27. The micro-positioner of claim 26, further comprising a plurality of bond pads to which electrical connections can be made to the clamp and push/pull arm actuators.

28. The micro-positioner of claim 27, further comprising analog or logic circuitry adapted to provide electrical signals to the bond pads to clamp and unclamp the directional clamps and push or pull the scanning bars in a stepping motion to change the position of a shuttle.

29. A micro-positioner, comprising:
   a shuttle assembly being adapted to move directionally;
   a scanning mechanism;
   the shuttle assembly being movable by the scanning mechanism;
   a first and second actuator;
   a first clamp controlled by the first actuator;
   the scanning mechanism being clamped with the first clamp that is controlled by the first actuator;
   a scanning bar that engages the scanning mechanism and imparts motion to it; the scanning bar being adapted to engage the scanning mechanism by the first actuator; the scanning bar being adapted to move the scanning mechanism by a second actuator; the scanning bar being mechanically coupled to both the first and second actuators; and the first and second actuators being controlled separately by applied electrical power.

30. The micro-positioner of claim 29, further comprising a MEMS device.

31. The micro-positioner of claim 29, further comprising: a first retainer structure to oppose the clamp force; and a second retainer structure to oppose the engage force of the scanning bar.

32. The micro-positioner of claim 29, wherein the first and second actuators are thermal expansion actuators.

33. The micro-positioner of claim 29, wherein the first and second actuators are piezoelectric elements.

34. The micro-positioner of claim 29, further comprising a mounting assembly being coupled to the shuttle assembly.

35. The micro-positioner of claim 29, further comprising the scanning bar having gear teeth to engage gear teeth on the scanning mechanism.

36. The micro-positioner of claim 29, further comprising the scanning bar being adapted to transfer a moving force from the scanning bar to the scanning mechanism through the friction due to the contact of the two.

37. The micro-positioner of claim 29, further comprising the shuttle assembly being adapted to move in a single direction.

38. The micro-positioner of claim 29, further comprising two orthogonal scanning mechanisms.

39. The micro-positioner of claim 29, further comprising the shuttle assembly being adapted to move in two orthogonal directions.

40. The micro-positioner of claim 29, wherein the scanning mechanism is constrained in-plane by a flexible spring.

41. The micro-positioner of claim 29, wherein the scanning mechanism is constrained in-plane by the force of the first clamp and the scanning bar.

42. The micro-positioner of claim 29, further comprising a second clamp opposed to the first clamp.

43. The micro-positioner of claim 29, further comprising a second scanning bar opposed to the first scanning bar.

44. The micro-positioner of claim 29, wherein the micro-positioner is implemented using micro-electro-mechanical systems (MEMS) technology.

45. The micro-positioner of claim 29, further comprising the shuttle assembly being adapted for accepting and holding a media.

46. The micro-positioner of claim 45, wherein the media comprises a nozzle.

47. The micro-positioner of claim 45, wherein the media comprises a valve.

48. The micro-positioner of claim 45, wherein the media comprises an optical device.

49. The micro-positioner of claim 48, wherein the optical device comprises a prism.

50. The micro-positioner of claim 45, wherein the media comprises a conductive wire.

51. The micro-positioner of claim 45, wherein the media comprises a fiber.

52. The micro-positioner of claim 45, wherein the fiber comprises an optical fiber.

53. The micro-positioner of claim 45, wherein the media comprises an antenna element.

54. The micro-positioner of claim 53, further comprising being operable as an active, adaptive antenna array.

55. The micro-positioner of claim 53, wherein the electronic signals positioning the micro-positioner are responsive to a predetermined RF profile.

56. The micro-positioner of claim 45, wherein the media comprises a lens.

57. An apparatus for aligning a media, comprising: a media holder being adapted to move directionally; a scanning mechanism; the media holder being contacted and moved by the scanning mechanism; a first and second actuator; a first clamp controlled by the first actuator; the scanning mechanism being clamped with the first clamp that is controlled by the first actuator; a scanning bar that engages the scanning mechanism and imparts motion to it; the scanning bar being adapted to engage the scanning mechanism by the first actuator; the scanning bar being adapted to move the scanning mechanism by a second actuator; the scanning bar being mechanically coupled to both the first and second actuators; and the first and second actuators being controlled separately by applied electrical power.

58. The apparatus of claim 57, in combination with devices for tuning electronic circuits.

59. The apparatus of claim 57, for use in a striplines.

60. The apparatus of claim 57, for use in positioning one from the group of sensors and end effectors.

61. A micro-positioner comprising:
a substrate having a top surface, a substantially planar bottom surface, and an aperture substantially centered through the bottom surface to the top surface;
a mounting assembly for accepting and holding a media or component;
a shuttle assembly, the shuttle assembly being attached to the mounting assembly; the shuttle assembly being adapted to move directionally in response to control signals; an electronic circuit coupled to the shuttle assembly;
the shuttle assembly being adapted to move in response to electronic signals from the electronic circuit;
the shuttle assembly further comprising a set of expansion bars springs and clamps for each direction of movement;
the set of expansion bars, springs and clamps being positioned and retained on the top surface of the substrate;
the expansion bars being manufactured of an expansion material adapted to expand and retract upon the application of a current directed by the electronic circuit;
the set of springs being positioned between a rigid surface of the substrate and a side of each of the expansion bars, the springs being operable to apply a force to the side of the expansion bars;
the springs being further operable to provide a flexible electrical interconnect, and a stabilization member for out-of-plane motion;
the clamps being manufactured of an expansion material adapted to expand and retract upon the application of a current directed by the electronic circuit;
the clamps being positioned to hold the expansion bars in place when the clamps are in a contracted state, when no electrical power is applied;
the clamps being operable to release the expansion bars when the clamps are in an expanded state, when electrical power is applied;

the mounting assembly being rigidly attached to the expansion bars; and the mounting assembly being centered over the substrate aperture when the shuttle is in a neutral location.

62. The micro-positioner of claim 61, further comprising the shuttle assembly being adapted for accepting and holding a media.

63. The micro-positioner of claim 62, wherein the media comprises a nozzle.

64. The micro-positioner of claim 62, wherein the media comprises a valve.

65. The micro-positioner of claim 62, wherein the media comprises an optical device.

66. The micro-positioner of claim 65, wherein the optical device comprises a prism.

67. The micro-positioner of claim 62, wherein the media comprises a conductive wire.

68. The micro-positioner of claim 62, wherein the media comprises a fiber.

69. The micro-positioner of claim 68, wherein the fiber comprises an optical fiber.

70. The micro-positioner of claim 62, wherein the media comprises an antenna element.

71. The micro-positioner of claim 70, further comprising being operable as an active, adaptive antenna array.

72. The micro-positioner of claim 71, wherein the electronic signals positioning the micro-positioner are responsive to a predetermined RF profile.

73. The micro-positioner of claim 61, being adapted to have dynamic operation and multiple cycles.

74. The micro-positioner of claim 61, further comprising being fabricated on a semiconductor top surface.

75. The micro-positioner of claim 61, further comprising having large steps and high resolution.

* * * * *